US008515473B2

(12) United States Patent
Mody et al.

(10) Patent No.: US 8,515,473 B2
(45) Date of Patent: Aug. 20, 2013

(54) COGNITIVE RADIO METHODOLOGY, PHYSICAL LAYER POLICIES AND MACHINE LEARNING

(75) Inventors: Apurva N. Mody, Lowell, MA (US); Stephen R. Blatt, Bedford, NH (US); Diane G. Mills, Wilmington, MA (US); Thomas P. McElwain, Merrimack, NH (US); Ned B. Thammakhoune, Manchester, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 842 days.

(21) Appl. No.: 12/074,772

(22) Filed: Mar. 6, 2008

(65) Prior Publication Data
US 2008/0293353 A1 Nov. 27, 2008

Related U.S. Application Data

(60) Provisional application No. 60/905,637, filed on Mar. 8, 2007.

(51) Int. Cl.
*H04W 72/00* (2009.01)
*H04B 15/00* (2006.01)

(52) U.S. Cl.
USPC ........ 455/509; 455/450; 455/452.1; 455/63.1

(58) Field of Classification Search
USPC .............. 455/63.1, 450, 452.1, 509; 370/329
See application file for complete search history.

(56) References Cited

U.S. PATENT DOCUMENTS

| 5,245,677 | A * | 9/1993 | Lepore et al. ................. 382/272 |
| 5,546,503 | A * | 8/1996 | Abe et al. ........................ 706/25 |
| 6,714,605 | B2 * | 3/2004 | Sugar et al. .................... 375/340 |
| 7,961,774 | B2 * | 6/2011 | Onggosanusi et al. ....... 375/144 |
| 2004/0047324 | A1 * | 3/2004 | Diener .......................... 370/338 |
| 2004/0203826 | A1 * | 10/2004 | Sugar et al. ................ 455/452.1 |
| 2005/0049983 | A1 * | 3/2005 | Butler et al. ..................... 706/13 |
| 2008/0102849 | A1 * | 5/2008 | Neel et al. ................. 455/452.2 |
| 2008/0189227 | A1 * | 8/2008 | Kandregula et al. ............ 706/10 |

OTHER PUBLICATIONS

Haykin, "Cognitive Radio: Brain-Empowered Wireless Communications," IEEE Journal on Selected Areas in Communications., vol. 23, No. 2, pp. 201-220, Feb. 2005.
Mendel, "Tutorial on Higher-Order Statistics (Spectra) in Signal Processing and System Theory: Theoretical Results and Some Applications," Proceedings of the IEEE, vol. 79, No. 3, pp. 278-305, Mar. 1991.
Real, "Feature Extraction and Sufficient Statistics in Detection and Classification," ICASSP—International Conference on Acoustics Speech and Signal Processing, vol. 6, pp. 3049-3052, May 1996.
Real, et al., "Open Set Classification Using Tolerance Intervals," Thirty-Fourth Asilomar Conference on Signals, Systems and Computers, vol. 2, pp. 1217-1221, Oct. 29-Nov. 2, 2000.

\* cited by examiner

*Primary Examiner* — Gennadiy Tsvey
(74) *Attorney, Agent, or Firm* — Robert K. Tendler; Daniel J. Long

(57) ABSTRACT

In a method of cognitive communication for non-interfering transmission, wherein the improvement comprises the step of conducting radio scene analysis to find not just the spectrum holes or White spaces; but also to use the signal classification, machine learning and prediction information to learn more things about the existing signals and its underlying protocols, to find the Gray space, hence utilizing the signal space, consisting of space, time, frequency (spectrum), code and location more efficiently.

1 Claim, 16 Drawing Sheets

Scenario and Action Table, *228*

| Detected Waveform | Transmitted Waveform |
|---|---|
| DSSS (Broadband) | Transmit using a narrow band higher power signal or another DSSS with an orthogonal spreading code. Use OFDM if necessary to fill up the spectrum |
| OFDM (Broadband) | Find unused sub-carriers and bands and transmit in them – use OFDM if necessary to fill up the spectrum |
| Frequency Hopping Spread Spectrum | Perform a time and frequency prediction of the next hop and occupy one or more sub-bands(s) that are predicted to be vacant. Find bands that are never used and occupy them – Use OFDM if necessary to fill up the spectrum. |
| Time Division Multiplexed Signal | Identify/Predict the temporal holes and transmit in them |
| Space Division Multiplexed Signal | Use adaptive beam-forming avoid interference at the receiver |

*Fig. 4F*

Scenario and Action Table for Cognitive Jamming, 230

| Detected Waveform | Transmitted Waveform |
|---|---|
| DSSS (Broadband) | Transmit using a narrow band higher power signal on the d.c. component or transmit a broad-band signal (such as OFDM) to occupy the DSSS band-width or another DSSS with the same spreading code. |
| OFDM (Broadband) | Find used sub-carriers and sub-bands and transmit in them |
| Frequency Hopping Spread Spectrum | Perform time and frequency prediction of the next hop and occupy one or more sub-band(s) that are predicted to be occupied. |
| Time Division Multiplexed Signal | Identify/Predict the next time of arrival and transmit any complimentary but dissimilar waveform with respect to the original one. |
| Space Division Multiplexed Signal | Perform adaptive beam-forming to target the beam at the receiver and transmit any complimentary but dissimilar waveform with respect to the original one to disrupt the communications. |

*Fig. 5A*

COGNITIVE RADIO METHODOLOGY, PHYSICAL LAYER POLICIES AND MACHINE LEARNING

CROSS-REFERENCE TO RELATED APPLICATION

This application claims rights under 35 U.S.C. §119(e) from U.S. Application Ser. No. 60/905,637 filed Mar. 8, 2007, the contents of which are incorporated herein by reference.

STATEMENT OF GOVERNMENT INTEREST

This invention was made with United States Government support under Contract No. W15P7T-05-C-P033 awarded by the Defense Advanced Research Projects Administration (DARPA). The United States Government has certain rights in this application.

FIELD OF THE INVENTION

The present invention relates to cognitive communications and more particularly to methods of signal processing, communications, pattern classification and machine learning, which are employed to make a dynamic use of the spectrum such that the emanated signals do not interfere with the existing ones.

BACKGROUND OF THE INVENTION

There are an increasing number of telecommunication services being proposed which, if fully implemented, could use up the allocated frequency spectrum. It is important to be able to provide such services without one service interfering with the other. If a service occupies the same frequency at the same time, there is a possibility of interference between the services which results in spectrum conflicts.

As will be described, so-called cognitive radios, which may employ software defined radio platforms, are capable of tailoring the transmitted output from the radio. With the advent of software defined radios, it is possible to alter the modulation type, frequency and the time of transmission to guarantee the transmission will not interfere with existing signals. Such radios may be adjusted, for instance, to inhibit transmission during times in which other signals exist. The signals from the software defined radios can also be controlled to emit non-interfering modulation formats. Programs such as the Next Generation (XG) communications funded by the Defense Advance Research Projects Agency (DARPA) propose systems where from radio scene analysis, one finds spectrum holes or White space which defines where signals may be transmitted without interference with other signals. Thus, White space refers to spaces that are not occupied by a signal.

While such systems create conditions fbr transmission such that the transmitted signal does not interfere with other existing signals, spectrum utilization with such techniques is somewhat limited.

As will be discussed, and as part of the subject invention, it has been found that there are so-called Gray spaces where signals only partially occupy the signal space. If it were possible to be able to detect not only White spaces but also Gray spaces, then the spectrum could be more fully utilized, assuming that one could transmit non-interfering signals in the White and Gray spaces.

Moreover, by analyzing the signal space for existing signals and providing predictors as to the future behavior of these signals, one can accurately predict future White space and Gray space. This permits robust tailoring of the transmitted signals so as not to interfere either with future signals.

More specifically, as telecommunications equipment evolves in capability and complexity, and Multiple-Input and Multiple-Output (MIMO) and Multi-User Detection (MUD) systems push the system throughput to its limits, it is not going to be too long before cognitive radios will reach the market place (J. Mitola, *Cognitive Radio: An Integrated Agent Architecture for Software Defined Radio*, Ph. D. Thesis, Royal Institute of Technology, Sweden, Spring 2000; and S. Haykin, "Cognitive Radio: Brain-Empowered Wireless Communications," *IEEE J. Select. Areas Commun.*, vol. 23, no. 2, pp. 201-220, February 2005).

In fact the IEEE 802.22 Working Group (IEEE Working Group 802.22, http://grouper.ieee.org/groups/802/22/, on Wireless Regional Area Networks ("WRANs")), has been looking to develop a standard for a cognitive radio-based PHY/MAC/air interface for use by license-exempt devices on a non-interfering basis in spectrum that is allocated to the TV Broadcast Service on Wireless Regional Area Networks (WRAN). Ad hoc groups under the Project Authorization Request (PAR) approved by the IEEE-SA Standards Board have started developing a cognitive radio-based PHY/MAC/air interface for use by license-exempt devices on a non-interfering basis in spectrum that is allocated to the TV Broadcast Service. Moreover, cognitive radios will help the commercial as well as the military communication systems, by doing away with the need for comprehensive frequency planning. It is contemplated cognitive radios will be capable of sensing their environment, making decisions on the types of signals present, learning the patterns and choosing the best possible method of transmitting the information. They will be situation aware, and capable of making decisions to ensure error-free and smooth transfer of bits between the users. Cognitive radios will be based on software defined radio (SDR) platforms and will try to understand not only what the users want but also what the surrounding environment can provide.

SUMMARY OF INVENTION

The present invention makes use of some of the recent advances in cognitive communications in which signal processing, communications pattern classification and machine learning are combined to make a dynamic use of the spectrum such that the emanated signals do not interfere with existing ones or ones projected to exist.

It is the purpose of the subject invention to conduct a radio scene analysis to ascertain existing signals in the signal space and to predict where the signals will exist in the future. Taking this information, the subject system predicts holes corresponding to White space or Gray space. Then the cognitive radio, or software-defined radio is configured to transmit signals in the unoccupied part of the spectrum which permits increased use of the spectrum. The signal transmission is not limited to the White or the Gray space in the spectrum, but to unoccupied or partially occupied signal space, where the signal space may consist of Space, Time, Frequency (Spectrum), Code and Location.

In one embodiment the subject system uses signal detection, feature identification, signal classification, sub-space tracking, adaptive waveform design, machine learning and sophisticated prediction algorithms to predict the behavior of existing signals and tailor emitted signals to avoid interference. This can be accomplished by inhibiting transmissions at certain frequencies and at certain times where existing signals are projected to exist; or to change the modulation type at selected times and for selected frequencies.

The subject system makes use of the Gray space as well as the White space for non-interfering signal transmission. Gray space is a space that is partially occupied by a signal. For example, a Direct Sequence Spread Spectrum (DSSS) signal with a spreading code of 4 chips can accommodate four different users using conventional signal processing techniques. However if only one user is using the network at a time then this forms a Gray space since the given spectrum is only partially used and it can accommodate three more users. Gray space can similarly be defined for other signal types.

The subject system adapts machine perception and Autonomous Machine Learning (AML) technologies to the autonomous detection and analysis of air interfaces. The underlying premise is that a learning module will facilitate adaptation in the standard classification process, so that the presence of new types of waveforms can be detected, features that best facilitate classification of the previously and newly identified signals can be determined, and waveforms can be generated by using a basis-set orthogonal to the ones present in the environment. Incremental learning and prediction allows knowledge enhancement as more snap-shots of data are processed, resulting in improved decisions.

In summary, in a method for cognitive communication, conducting radio scene analysis is used to find spectrum holes as well as space for non-interfering signal transmission.

BRIEF DESCRIPTION OF THE DRAWINGS

These and other features of the subject invention will be better understood in connection with the Detailed Description in combination with the Drawings of which:

FIGS. 4(a) through 4(f) are diagrammatic illustrations showing policies and examples of non-interfering signal transmission in the White as well as the Gray space indicating an Existing Signal and a New Signal or Signals, in which in FIG. 4(a) the classifier detects a Single-Carrier+Non-Frequency Hopping+Broad-band indicating a Direct Sequence Spread Spectrum (DSSS) signal, in which, based on the policy set, a Frequency Hopping Spread Spectrum (FHSS) waveform is transmitted over the entire band; in which in FIG. 4(b) the classifier detects a Multi-Carrier+Non-Frequency Hopping+Broad-band indicating an Orthogonal Frequency Division Multiplexing (OFDM) signal; in which in FIG. 4(b) an FHSS signal is transmitted only in the White Space; in which in FIG. 4(c) non-competitive communications makes use of only as much band-width as it needs making sure that the original FHSS (Multi-Carrier+Frequency-Hopping+Narrow-band) signal is not destroyed; in which in FIG. 4(d) an example is shown of a competitive signal transmission where prediction information in time as well as the frequency is used to configure a software radio to transmit in all the possible windows that the radio "thinks" are available; in which in FIG. 4(e) a non-interfering, jam-resistant signal flow diagram is presented; and in which in FIG. 4(f) a Scenario and Action table is presented for the Physical Layer policy set when the signals and protocols detected and of a known type;

FIG. 5(a) is a cognitive jamming flow diagram; and,

DETAILED DESCRIPTION OF THE PREFERRED EMBODIMENT

Figure 1A:
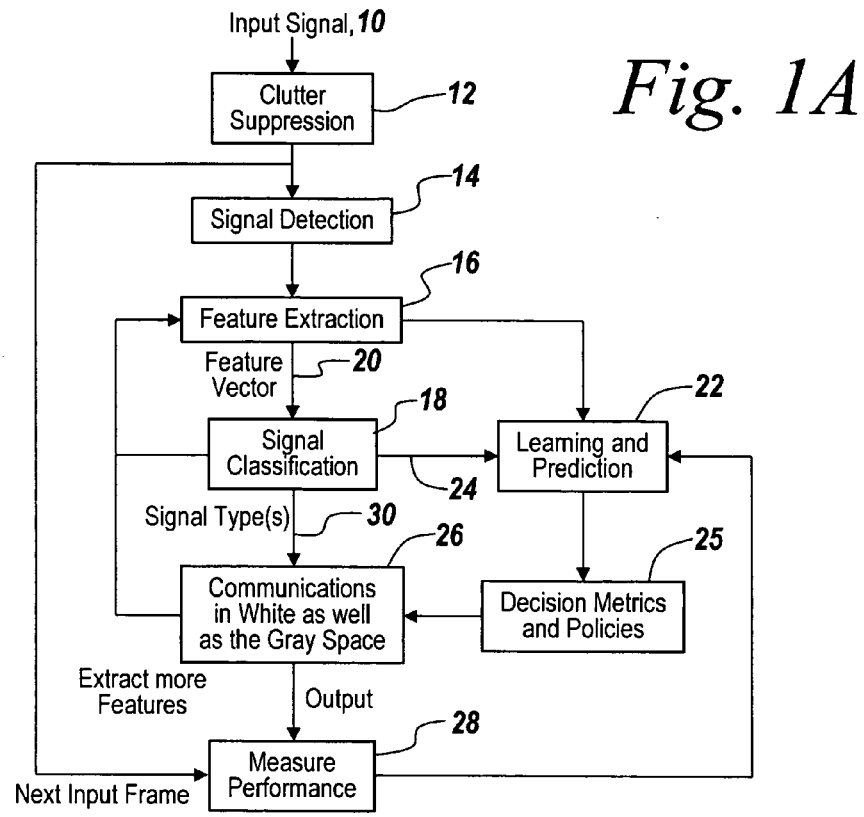
FIGS. 1(a) and 1(b) are diagrammatic illustrations showing the cognitive communications system methodology and signal processing flow, wherein signal detection is followed by feature extraction, clustering (un-supervised learning), signal classification into types, machine learning and prediction to understand the time and frequency domain behaviors of the existing signals and based on some decision metrics or policies to transmit the signals in both the White as well as the Gray space so that the new signals do not interfere with the existing ones.

Prior to a more detailed description of the subject invention, through the utilization of cognitive radio, one can both detect the signal environment, predict future signal environments and then tailor the output of the radio's transmitter to provide non-interfering signals. A system for detecting White and Gray spaces becomes increasingly important with the allocation of the VHF band below 700 Megahertz. When this allocation becomes implemented, commercial companies can use it for unlicensed use, for instance, to provide WiFi services. This portion of the spectrum will not be regulated in the sense of being licensed, but rather can be utilized on an unlicensed basis. It, therefore, becomes important that this portion of the spectrum for which primary signals such as TV signals, microphone signals and other signals that might exist be protected by providing cognitive radios to make sure that the existing signals are not interfered with or trampled on. In short, the so-called primary providers or primary users must be protected from interference.

As mentioned above, cognitive radios are radios that have the ability to sense the environment, and this sensing can occur in two domains. It can be at a physical and lower layer involving physical and medium access control; or it could be at a high level.

From a physical layer point of view, the minimum capability that the cognitive radio should have is that it should be able to sense the environment, for example, the spectrum, and go into a particular spectrum to try to figure out whether the spectrum is occupied or not occupied. While such capabilities have existed in the past, in the subject invention, one is not just ascertaining whether the spectrum is occupied or not occupied, but rather the system ascertains what exactly the spectrum contains and what kind of signals exist. This is because sometimes one can have certain signals that would indicate that the entire spectrum is occupied and cannot be used. However, it is possible under certain circumstances that the so-called fully occupied spectrum is usable.

For instance, it may happen that a signal comes on only 10 percent of the time and 90 percent of the time the signal does not occupy the signal space. If one could ascertain the 90 percent quiet time, for instance, by using machine learning and other signal processing algorithms to figure out whether the spectrum is occupied, what kind of signals are present in it, what the behavioral pattern of the signals are, and how the signals may be classified, then the subject invention provides a way for a radio to transmit signals which do not interfere with the existing or projected signals in the signal space.

For instance, classification of the signals can determine whether these signals belong to a time division multiplex system or a frequency division or code division multiplex system, and from the behavioral pattern, one can predict if one can use the spectrum or not.

As defined above, White space is defined as a signal space which is completely unoccupied. One can detect the signal space and see whether or not signals exist in that space. If not, White space is detected, and unregulated signals can be transmitted in this space.

From a physical perspective, if for instance a signal is being projected by a beam forming antenna, the signal might occupy only one portion of a geographical space, but not another. If the beam is utilized to project energy in a given direction, assuming that one could ascertain this, then one could project energy into geographic regions where the beam does not exist.

The subject system thus depends on three different concepts, namely White space, Gray space and Black space. Black space is a space that cannot be used at all. This is because there is no room for another signal to coexist. The moment one tries to emit a signal in this Black space, one is going to destroy signals that exist there.

Gray space is a signal space which is partially occupied so there is room for more signals to come in.

By way of definition as to what constitutes signal space, signal space is basically a multidimensional feature space.

While systems in the past have concentrated on White space, the subject application introduces the concept of Gray space, which infers that a signal space is not merely spectrum, but is multidimensional feature space consisting of space, time, frequency, code and location.

By being able to sense this Gray space signal environment, software defined radios determine how it is that signals can either coexist in that space, be multiplexed in that space by employing frequency, code division or time division multiplexing, or use multi-user detection techniques so that the Gray space can be maximally utilized.

It is the purpose of the subject invention to try to make efficient use of the signal space so as, first of all, to have unblended and structureless communications. It is the purpose of the software defined or cognitive radio to sense a particular environment or signal space and make efficient use of the delivery resources so that one can have assured, unplanned and structureless communications.

As will be described, part of the subject invention relates not only to the efficient use of the signal space but also for the implementation of cognitive jamming. In cognitive jamming the signal space is detected and characterized such that with the character and predicted nature of the signals being detected, one can design jamming signals that consume a minimal amount of energy and resources.

Returning now to cognitive communications, signal processing, sensing and signal classification, as well as machine learning, was utilized to figure out the existing signals in a given signal space in terms of what their characteristics are and how they use the space so that one can find what space is available and then use that space. In short, the system finds out a way to communicate using the same signal space.

How one detects the signal space and predicts the future for the signals that do exist in the space will be described hereinafter. These include spectrum analysis and signal detection utilizing high order statistics. In one embodiment, one first attempts to identify the existing signals by collecting wave forms that are being transmitted in the air, using algorithms first to detect if there is any signal present, and then parsing the samples into structured energy or unstructured energy based on high order statistics. Whenever one finds structured energy, one determines that there is an existing signal. Thus, for every segment of data the system tries to figure out whether it contains some structured energy or not. If it does contain structured energy, it means that the signal has some information, making it an information bearing signal. This means that the probability of a signal being present goes up. The analysis provides the places and times where a signal has occurred and where it is likely to occur in the future.

Not only does the subject system analyze the time period that the signal occurs, it also looks into the frequency dimension as well. In one embodiment, the signal and time information is combined to form a cluster. The cluster enables ascertaining whether signal chunks belong to the same signal and thus is part of the same signal. With clustering, which is an autonomous process, one can have enough knowledge as to where in time and frequency the signal exists.

In another embodiment the time and frequency for a certain signal may not be sufficient if it is an aperiodic signal. The signal might be a frequency hopped signal. Thus, one must collect enough information to not only know its existence but to predict the future existence. In the present invention this is accomplished utilizing signal classification and machine learning that collects and processes what has already happened so as to predict when it will happen again and be able to tailor the transmission so as not to interfere with a particular behavior.

Signal classification goes further into the detail of the signal and tries to figure out what kind of signal it is. For instance, one might have a broad band or narrow band signal, one might have a frequency hopping or non-frequency hopping signal, one might have either a single carrier or multi-carrier signal, or one might have a signal which is either broad pulsed or narrow pulsed. Finally one can ascertain through signal classification how many signal types are present.

The signal classification, for instance, in the case of a frequency hopped signal, indicates where there is going to be a frequency hopped signal. If it is determined to be a frequency hopped signal, one has to be able to detect and predict in a different manner than if it was a simple frequency-stable periodic signal.

If one has detected a broad band signal that is not frequency hopping, it may nonetheless be a periodic because it exists and then doesn't exist during various time intervals. One, therefore, has to predict its characteristics in a different manner.

Thus, every class of signal that one finds has to have a corresponding prediction algorithm which is how one is to broadly classify what signals exist and where they are going to be.

In short, the subject system includes a prediction module that tries to predict the future patterns of the signal, and this is done through initial classification.

After the initial signal classification, in one embodiment one employs machine learning to predict the Gray spaces. Note that feature extraction clustering and signal classification enables machine learning to accurately make the prediction. Machine learning also includes cluster matching and associative learning and involves multiple predictor pattern matches. In one embodiment, a number of different pattern matches are evaluated.

In the learning cycle, one does not transmit any information. One rather gathers signals, detects signals from clusters, and parses the information into signal classes.

The system then uses feature sets in determining whether or not there is Gray space. The ascertation of Gray space includes analysis of bandwidths, time widths, center frequencies of clusters, standard deviations, repetition frequencies and other statistical features often employing high order statistical calculations as well as singular value decomposition.

Referring now to FIG. 1(a), what is shown as a block diagram of the subject system in which an input signal 10 is coupled to a clutter suppression module 12 in turn coupled to a signal detection module 14 followed by coupling to a feature extraction module 16 which in turn is coupled to a signal classification module 18.

Note that the feature extraction module 16 outputs a feature vector 20 to signal classification module 18. Feature extraction module 16 is also coupled to a learning and prediction module 22 which in combination with the signal output from the signal classification module 18 on line 24 predicts for a given signal that has been detected where any Gray space may occur.

The output of the learning and prediction module 22 is coupled to a decision metrics and policies module 25 to control the output of a software defined radio to communicate in either White or Gray space as illustrated at 26.

In one embodiment the performance measurement module 28 is coupled to the output of module 26 to measure the performance of the system and to update the learning and prediction module 22.

Note that the signal classification module 18 outputs the signal type or types 30 to communications module 26 of the software defined radio so that when a decision is made as to how the software defined radio is to output information, the signal type information is available.

Figure 1B:
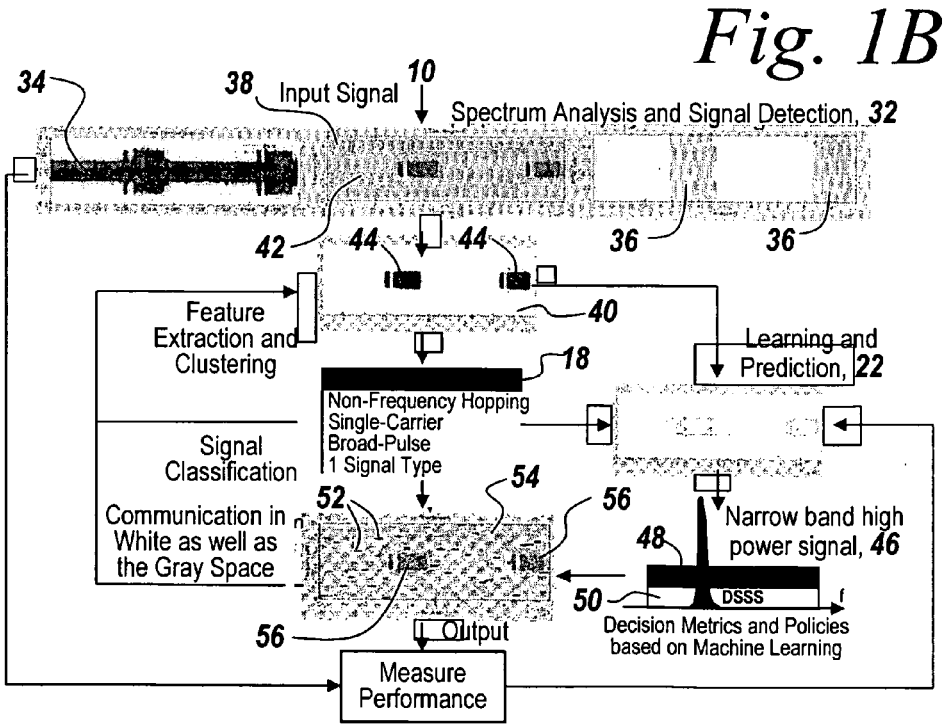

Referring to FIG. 1(b), how the system FIG. 1(a) operates is described in more detail. Note that for the spectrum analysis and signal detection which includes clutter suppression and signal detection modules 12 and 14 is here illustrated at 32. Waveform 34 shows the original signal, whereas waveforms 36 show the detected signal.

The purpose of module 32 is to ascertain where the signal occurred in time and frequency.

In order to ascertain the characteristics of the signal, it is possible using time and frequency to at least understand what band the signal is occupying and how it is occupying the band. This time frequency spectrogram is shown at 38. The spectrum analysis and signal detection indicates in the waveforms 36 where it is that one does not wish to transmit information.

Where to transmit and where not to transmit information is defined by policy sets in which the policies are separated into competitive and non-competitive. The non-competitive policy set is a policy set which is rather conservative. It makes sure that it is 100% possible to transmit signals in this region of the signal space because they will not interfere. However, setting a non-competitive policy set minimizes the amount of spectrum that can be utilized.

The competitive policy set is based on the prediction of where the existing signals will exist and makes use of the prediction so that one can transmit in these regions regardless of the fact of an existing signal.

Note that from the time frequency detection of module 38 one can through feature extraction and clustering further isolate the existing signals as illustrated at 40. Note also that here, a Direct Sequence Spread Spectrum (DSSS) is inputted to Module 38, with the occupied spectrum space illustrated by shading 42.

With the feature extraction and clustering, one can isolate the DSSS signal as illustrated at 44 and use this information for the signal classification which has five basic classifications namely: broad band, non-frequency hopping, single carrier, broad pulse, and one signal type. The selected classification of the signal is coupled to learning and prediction module 22 which then determines that one could utilize a narrow band high power frequency hopping signal 46 to coexist with the DSSS signal 48 and 50. The DSSS signals correspond to code-division multiple access signals, whereby it can be seen that the narrow band high power signal will not significantly interfere with these signals.

In terms of the ability to communicate in the White and Gray Space, one can see that one can inject signal 52 occupied space 54, which signals do not interfere with the DSSS at 56.

What this shows is that it is possible in one instance with a narrow band high power signal to transmit in the signal space initially occupied at least partially by a DSSS signal.

Figure 2A:
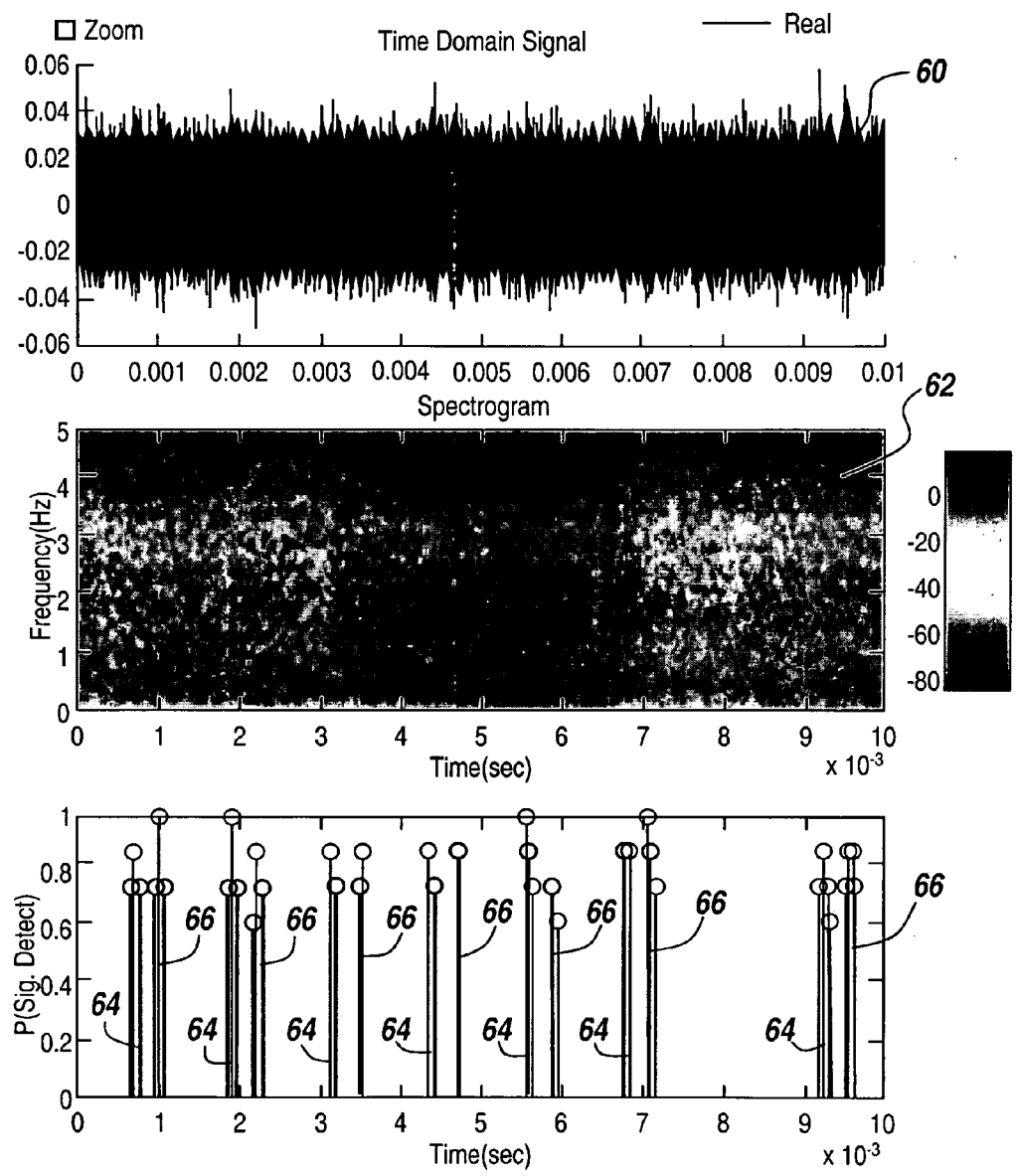
FIG. 2(a) is a diagrammatic illustration showing signal detection in Gaussian noise: Top: Time domain waveform of the Bluetooth™ signal heavily buried in noise, Middle: Spectrogram of the same signal, Bottom: Probability that some useful signal is detected for different time segments of the received waveform using Higher Order Statistics.

What is seen in FIG. 2(a) is the signal detection stage for another class of signals. For instance, the first signal here illustrated at 60 is narrow band with a fairly small energy such that the signal is buried in noise and can not be detected easily. In 62, one can see this signal in the frequency domain. Note that in FIG. 2(a) it is very difficult to figure out exactly where this signal is occurring, meaning that what is presented looks like noise.

One of the subject algorithms is quite powerful and can basically parse the structured energy from the unstructured energy to figure out where the signal is occurring. Note that the probability of a signal occurring in the spectrogram at the bottom of FIG. 2(a) shows that signals 64, 60, and 66 occur at precise predictable times.

It can be seen that signal 60, once obscured, in spectrogram 62, can be seen using artificial signal processing to enhance the appearance of the signals that are coming in, namely the frequency hopping signals. In the middle spectrogram of FIG. 2(a), one can see small dots corresponding to a signal detection spike. Thus, wherever a dot has occurred corresponding to the frequency hopping signal, signal detection predicts where the frequency hopped signal has occurred in time and presents this as a highly visible line in the bottom FIG. 2(a).

Figure 2B:
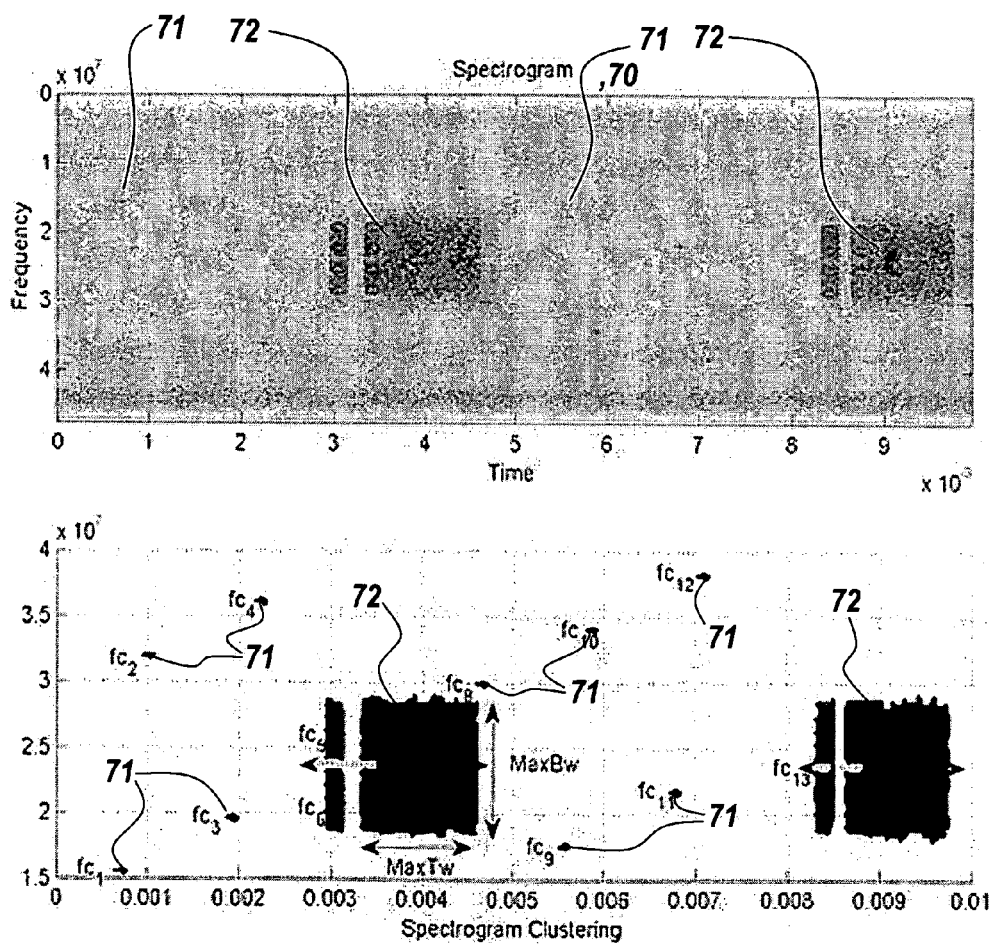
FIG. 2(b) is a diagrammatic illustration showing spectrogram clustering including a scenario where Bluetooth™ and IEEE 802.11b signals are present in the same spectrum, in which spectrogram clustering is used to identify different clusters in a 10 mS frame of data, and in which features are extracted from each of the clusters and fed to the classifier in order to separate the various signals.

Referring now to FIG. 2(b), what is shown is clustering and feature extraction. What is shown here is that in the spectrogram 70 the signal is shown with the time domain on the horizontal axis and frequency on the vertical axis, with the clustered points 71 and 72 showing where exactly the signal has occurred. It will be appreciated that one can have multiple dimensions. Therefore, one wishes to have multiple dimensions in which to try and figure out where these signals are occurring and do so in an autonomous fashion.

Thus, what is shown in FIG. 2(b) is image processing clustering in the frequency dimension so as to provide a spectrogram of frequency versus time. Note that the image consists of pixels or clusters from which one can see that one has certain pixels that belong to the same signal. Thus, one has a spectrographic way of ascertaining that certain pixels are the result of the same signal.

Note in this spectrogram there are two signals that are occurring at the same time. First there is a frequency hopping signal shown at 71, and then there are blocks 72 which correspond to a direct sequence spread spectrum signal.

As can be seen the block 72 can be further isolated using spectrogram clustering such that the block 72 can be classified on the basis of features such as time width of the clusters, bandwidth of the clusters, center frequency of the clusters, standard deviation of the center frequency of the clusters, statistical features such as the higher order statistics, singular values in a singular value decomposition, time of arrival, time difference of arrival, mean, variance, standard deviation, probability of event occurrence of the various features, raw or processed features, time frequency detection ratio etc. In this particular instance, shown are the maximum bandwidth MaxBW, maximum time MaxTw and center frequencies of the clusters fc are shown by the arrows.

Having utilized spectrograms in clustering one can determine certain characteristics of the input signal.

Referring now to FIG. 2(*c*), this figure shows a general way in which a normal machine learning and classification stage would work. Here a classifier 80 includes feature measurement 82 followed by a module 84 to make classification decisions such that as illustrated three classes of signals are outputted. It is possible as shown at 86 to score the results and provide feedback over line 88 to a train classifier modules 91 that provides weightings 92 to classification decision module 84.

In designing the classifier, as illustrated at 90, one chooses features 92 and models 94 which are used by module 96 to design the classifier.

Note that the chosen features are inputted to the feature measurement module 82 as illustrated by line 98 and that design classifier 96 outputs the design classifications on which a decision is made over line 100.

What will be apparent from the FIG. 2(*c*) machine learning and classification stage is that, for example, on the basis of features such as time width of the clusters, bandwidth of the clusters, center frequency of the clusters, standard deviation of the center frequency of the clusters, statistical features such as the higher order statistics, singular values in a singular value decomposition, time of arrival, time difference of arrival, mean, variance, standard deviation, probability of event occurrence of the various features, raw or processed features, time frequency detection ratio etc. machine learning and signal classification may be carried out.

In order to detect identify and classify the signal one needs a very powerful feature measurement stage. The feature measurement stage measures all the features because these are the measurement factors which help one to make a decision as to what signals will exist in the future.

Having decided that the signal has certain features, the output of feature measurement module 82 is coupled to classification module 84 to make the classification decision. The results are scored so that one can understand how well the classification algorithms are behaving. Given this scoring, the system goes back to train the classifiers, making the system an adaptive system.

The adaptive nature of the classifier may be understood as follows: For instance if one needs one more feature to finally ascertain the character of the incoming signal, the training classifier module 91 provides the additional features to be able to make a more robust classification. Thus, the classifier is adaptive and is able to be trained based on scoring results and the training provided by classifier training module 91.

Referring to FIG. 2(*d*), what is shown is the result at the end of the classification stage wherein a typical classification stage takes into account different features that are measured. In one embodiment one chooses the carrier frequency, the center frequency of a cluster, the time width and the bandwidth. Note that these features are enough to separate three different protocols namely Bluetooth™, 802.11b, and 802.11g. As can be seen in the feature space of FIG. 2(*d*), different signals occupy different regions. Here it can be seen that the Bluetooth™ occupies region 110 whereas 802.11g occupies region 112 and 802.11b occupies region 114. Thus, one can clearly see that one can separate the signals into three classes and accurately classify these signals.

Once having classified the signals one can understand the existing signal in a better way and create a new signal in the feature space where the signals do not exist. Referring now to FIG. 3(*a*) what can be seen is a spectrogram 120 of time versus frequency for a Bluetooth™ signal which, as can be seen from the pixels 122, is a narrow band frequency hopping signal. This is a typical spectrogram which when clustering is performed and signal classification is performed, one ascertains what the incoming signal is and how it looks. More importantly it also provides the features for predicting where the signal will exist in the future.

Referring to FIG. 3(*b*) once one has extracted a number of features of the signal, one can give it to a number of predictive pattern matchers. The features are shown at 126 which are coupled to cluster matchers 128, 130, and 132, that are respectively coupled many predictive pattern matchers 134 and 136, with the outputs of all the predicative pattern matchers coupled to a module 140 which evaluates predictions.

If upon evaluation of the outputs from the predictive pattern matchers one needs to develop a new pattern this is done at module 142, this new pattern 144 is installed in the predictive pattern matchers, thus making the cluster matching and pattern matching adaptable.

Referring to FIGS. 3(*c*) and 3(*d*), these figures show one of the pattern matchers and how they operate. They also show how machine learning takes place over time.

Note that FIGS. 3(*c*) and 3(*d*) are three-dimensional figures, one axis of which showing the time since the last pulse. This in essence graphs how much time has elapsed since the last pulse.

The other axis is graphing the time to the next pulse. So if one pulse just occurred, when is the next pulse going to occur in time?

The vertical axis simply shows how many instances of the feature have occurred. Thus, in FIG. 3(*c*) one has a three-dimensional space where there are a number of instances versus certain time characteristics that are graphed.

It is noted that FIGS. 3(*c*) and 3(*d*) are the same figures over different periods of time and they represent a particular implementation of a predictive pattern matcher.

In FIG. 3(*c*) one can see a very short time duration for the time to next pulse and time since last pulse. After for instance a hundred milliseconds of learning one can clearly start seeing that there are certain spikes that are becoming more and more pronounced. This is because of the pattern which is present inside the signal repetition pattern.

What the system learns is that there is a certain repetition and that there will be more instances in that repetition. Thus, if a pulse occurs at one point there is a high probability that it will occur for instance at 10 milliseconds later, such that there is a strong correlation set up.

Figure 3A:
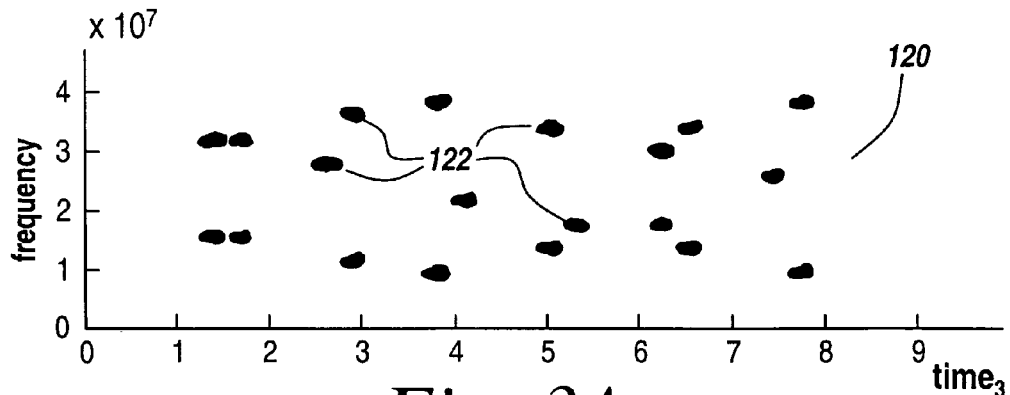
FIG. 3(a) shows the spectrogram (time and frequency domain behavior) of a 10 mS snippet of a Bluetooth™ signal.
Figure 3B:
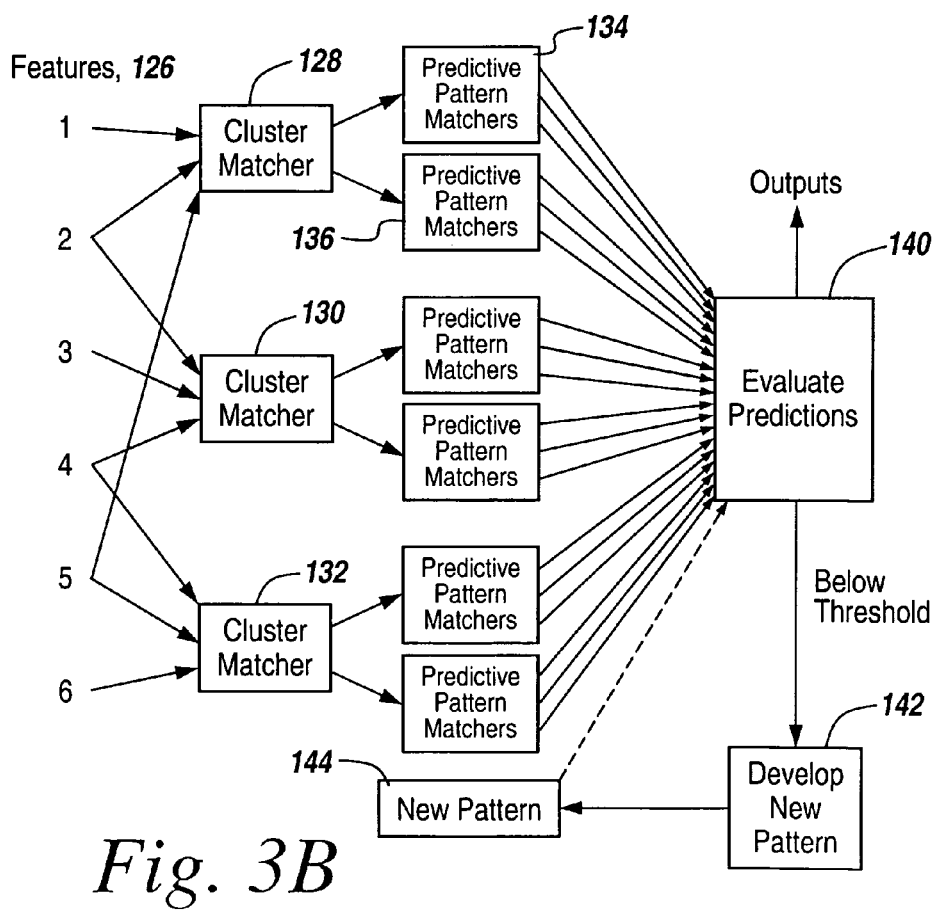
FIG. 3(b) is a diagrammatic illustration showing how based upon certain quality factors the best predictor may be chosen from a library of predictors.
Figure 3C:
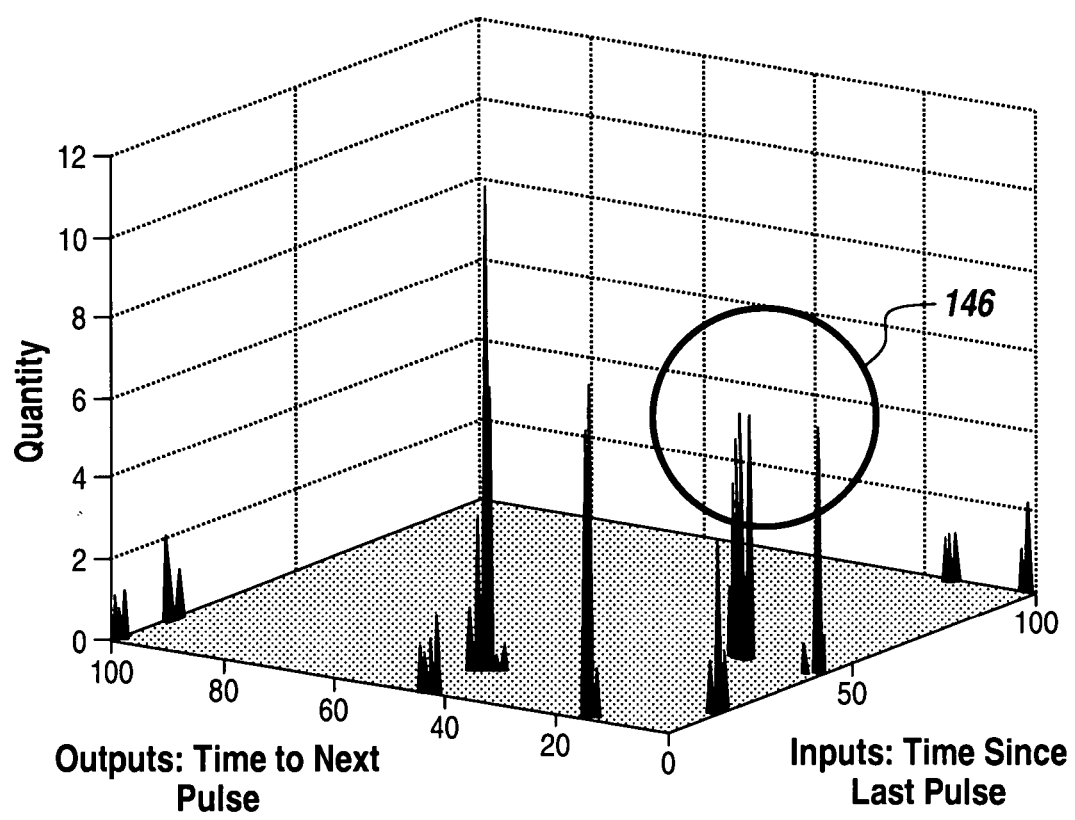
FIGS. 3(c) and 3(d) are diagrammatic illustrations showing how incremental learning improves the performance of the next time hop predictor for the Bluetooth™ signal with the figures showing that, as more information is available during the incremental learning, the prediction spikes become larger improving the prediction capability, the drawings showing how the incremental learning prediction spikes become larger such that the prediction capability is improved.
Figure 3D:
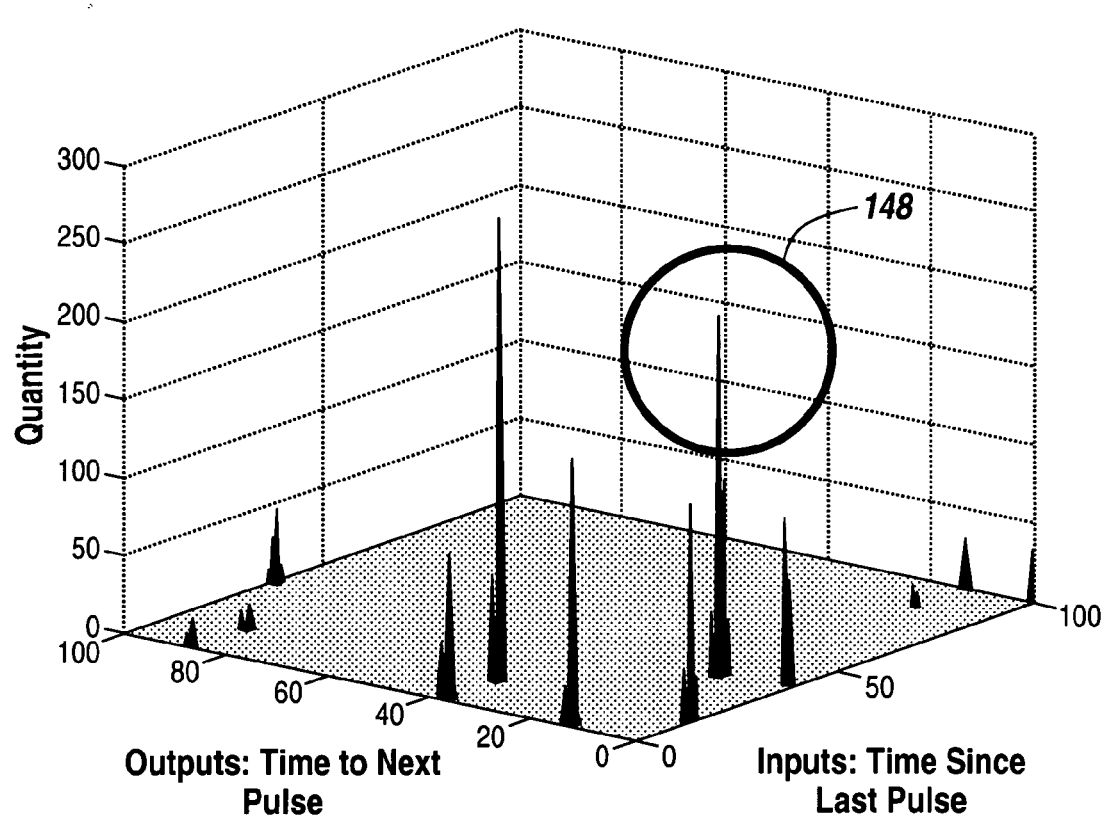

What is shown by the short time interval of FIG. 3(c) is that there are a certain number of peaks illustrated in the circle 146, whereas after a certain amount of time has elapsed as shown in FIG. 3(d) there is only one peak as shown in circle 148, making the prediction rather robust.

Figure 4A:
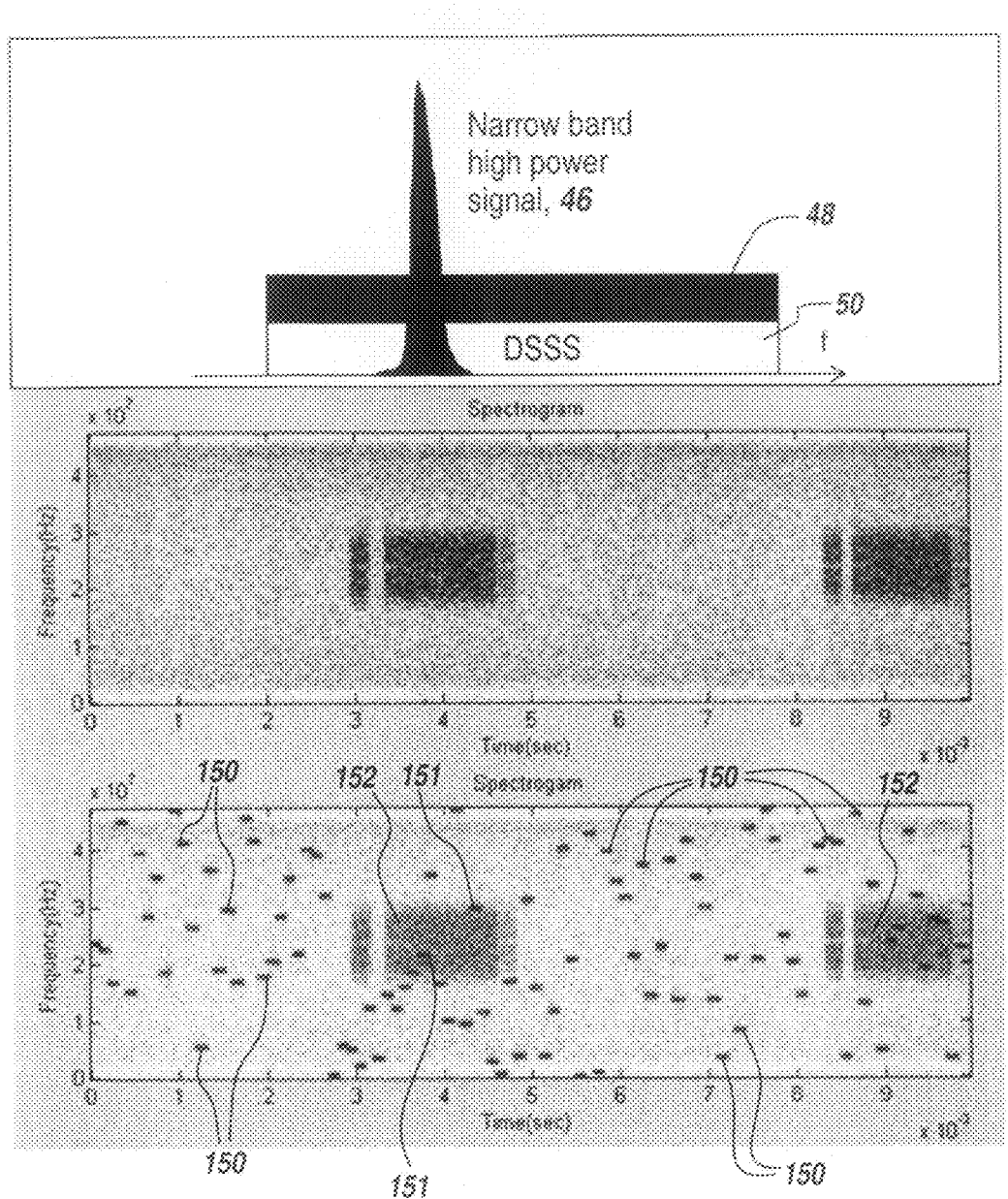

FIG. 4(a) is a diagrammatic representation of how a predictive pattern matcher works and how the machine learning stage works. FIG. 4(a) shows a number of policy sets. What would be for instance the policy given that one has detected and classified a signal to be of a certain type? For instance, if one has detected a signal which is occurring currently, it may be deduced that the signal is a direct sequence spread spectrum signal. One can then apply two different policies to this direct sequence spread spectrum signal. One policy is that one transmits another direct sequence spread spectrum signal on top of whatever is in the signal space which will not interfere as shown in 48 where the orthogonality is achieved in the code domain. Or for another instance, the new transmitted signal may have a narrow band high power as shown in 46 and may or may not hop in the frequency to create minimum unwanted interference. This is done through the common knowledge that a DSSS signal is resilient to a narrow band interfering signals.

What is shown is that what is detected is a broad band direct sequence spread spectrum signal here shown at 48 and 50. This shows that in this particular instance one can transmit a narrow band frequency hopping signal to share the spectrum with the DSSS signal.

Thus, as can be seen at 150, signals in this region of the spectrogram do not interfere with the direct sequence spread spectrum signals at 152. Even if a narrow band high powered signal interferes occasionally with the broadband DSSS as shown in 151, it creates a limited negative impact to the existing DSSS signal. This spectrogram shows how not just the White Space as shown in 150, but also the Gray space as shown in 151 is utilized.

Figure 4B:
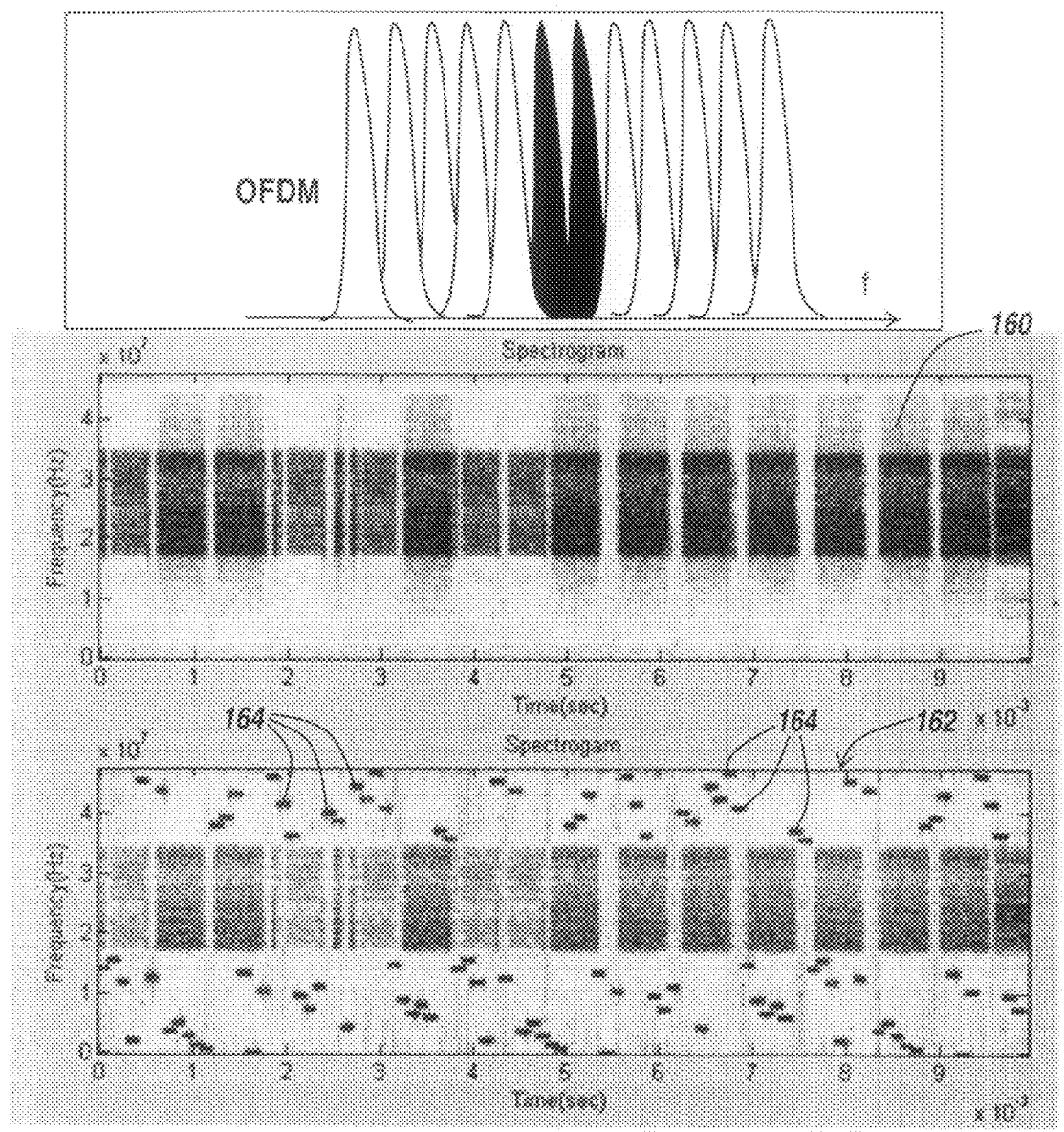

What is shown in FIG. 4(b) is the detection of an orthogonal frequency division multiplexing system OFDM. The original spectrogram 160 shows the characteristics of this type of signal, whereas the spectrogram in 162 shows that there are regions that are unoccupied by the OFDM signal where a narrow band high power signal, here illustrated at 164, can be inserted. Note that the OFDM signal is a very popular waveform used in 802.11, WiFi systems or the new WiMax systems. This modulation format is extremely efficient but has certain properties which make it easily susceptible to interference. What happens is that for OFDM signals one divides the entire chunk of bandwidth that one is using into small sub-channels or sub-carriers. While these sub-channels or sub-carriers are extremely efficient, there is a downside in that any interference in the sub-channels can destroy the sub-channel because they are already narrow bands.

In the subject system, one has the capability to distinguish whether the incoming signal is a single carrier or a multi-carrier signal. If it is a multi-carrier signal, it is most likely an OFDM signal. As will be appreciated orthogonal frequency division multiplexing is just another name for a multi-carrier signal. Further, any OFDM signal being a multi-carrier signal precludes the possibility of transmitting right on top of it. However as can be seen there is gray space even in an OFDM situation.

How one can transmit over an OFDM signal is now discussed. Due to the broad signal classification one can determine whether the incoming signal is a broad band signal, whether it is a non-frequency hopping signal, whether it is a multi-carrier signal or whether it is a single carrier signal. The system can distinguish between single carrier and multi-carrier signals. If the system finds that the signal is a multi-carrier single doing, clustering ascertains exactly where these signals are present. One can also do machine learning to see how the signal is being transmitted and exactly where it is occurring. While there is no room in the time domain in the above example one can see that there is room in the frequency domain. Thus, one could use frequency hopping not to interfere with OFDM signals.

Figure 4C:
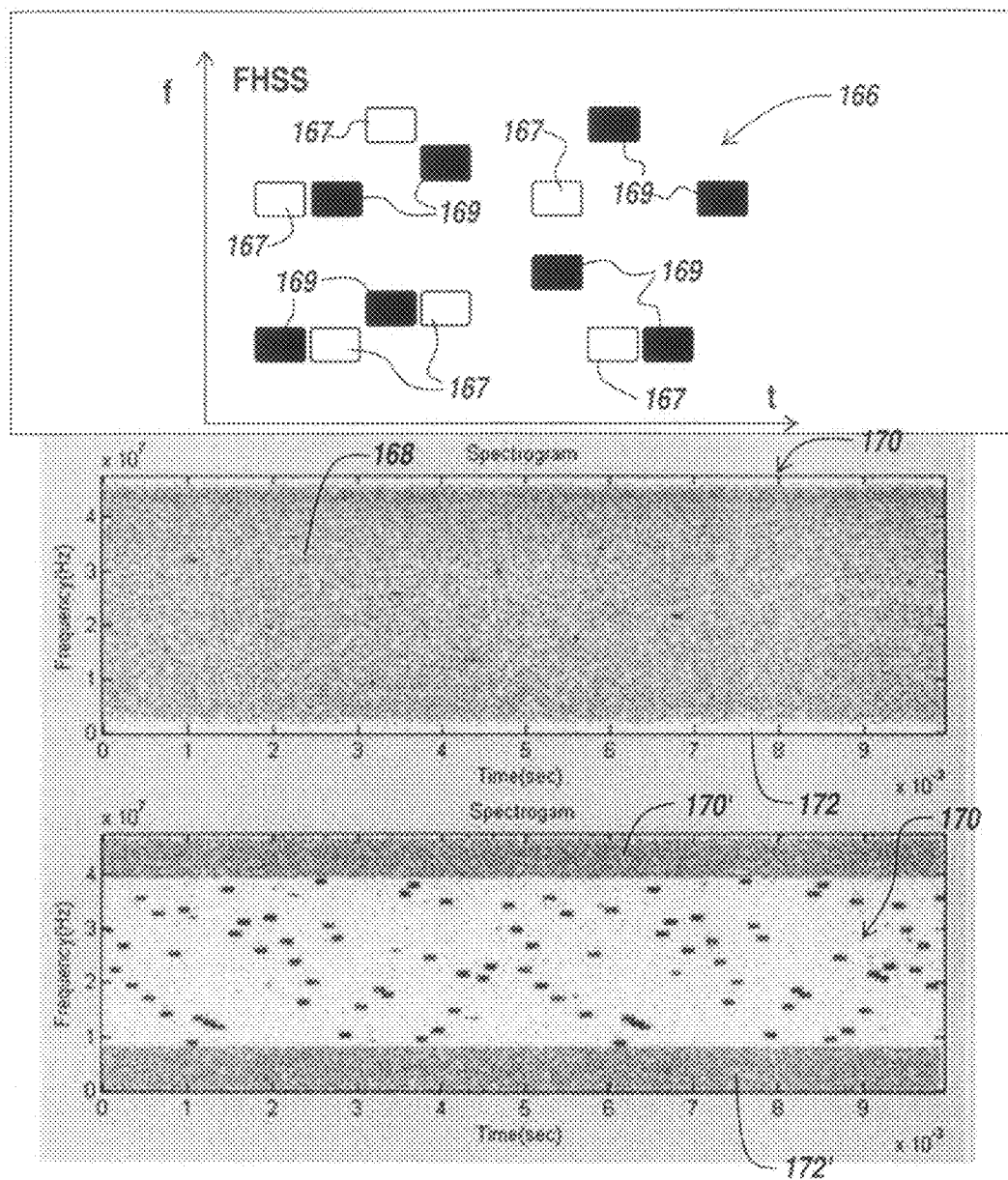

While FIG. 4(h) shows a non-competitive placing of signals, in FIG. 4(c) what is shown is a competitive transmission. Note that the original signal is a frequency hopper, for instance a Bluetooth™ type signal. Bluetooth™ signals are narrow band frequency hoppers. It hops over perhaps 70 Megahertz. Note that the top diagram shows a spectrogram 166 of the narrow band frequency hopped signals. Note that in spectrogram 166, blocks 167 show the original signal and blocks 169 show how one could implement the frequency hopping on a non-interfering basis.

As can be seen by spectrogram 168, there are regions, or bands 170 and 172 which exhibit very little energy.

These regions, as can be seen in spectrogram 170, as relatively broad bands 170 and 172 such that if the transmitted signal occupies only the top and bottom bands, which involve spectrum features not occupied by the Bluetooth™ signal then there is no interference. Also if one transmits another frequency hopper on top of it using machine learning and prediction information then there is no interference.

Figure 4D:
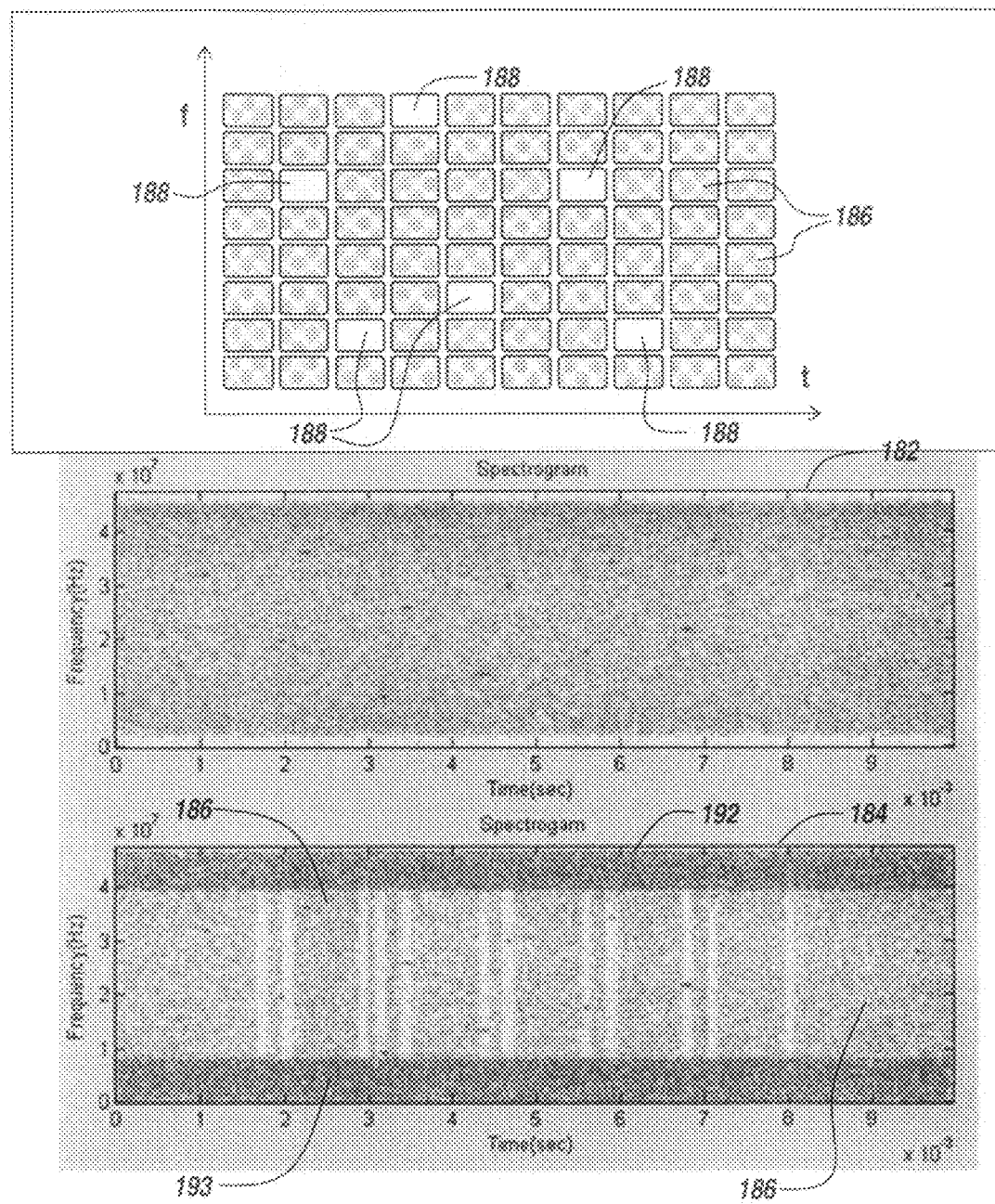

FIG. 4(d) is another scenario involving an instance of even more severe competitive transmission. Note that once again the original signal is a frequency hopper, for instance a Bluetooth™ type signal. Bluetooth™ signals are narrow band frequency hoppers. It hops over perhaps 70 Megahertz. Note that the top diagram shows a spectrogram 188 of the narrow band frequency hopped signals. It will be appreciated that the spaces illustrated by 186 are spaces that in FIG. 4(c) were not utilized. If one could in fact inject signals at these points one could more completely utilize the spectrum to its fullest extent. Note that spectrogram 182 is the spectrogram of the signal. As in the previous case of FIG. 4(c), signals are transmitted in the top and the bottom bands 192 and 193, utilizing the White Space. But in addition, time of arrival prediction information is utilized to transmit more signals in empty spaces as indicated in 186 to make use of the Gray space and hence a greater use of the spectrum.

Sometimes there is overlap between the new transmitted signal 186 and the original signal 188. What this shows is that using the suggested technique greater than 90% utilization of the spectrum can be achieved with very little or no interference to the original signal. Going to the top figure, it can be seen that blocks 186 are the places where one could inject non-interfering signals.

Figure 4E:
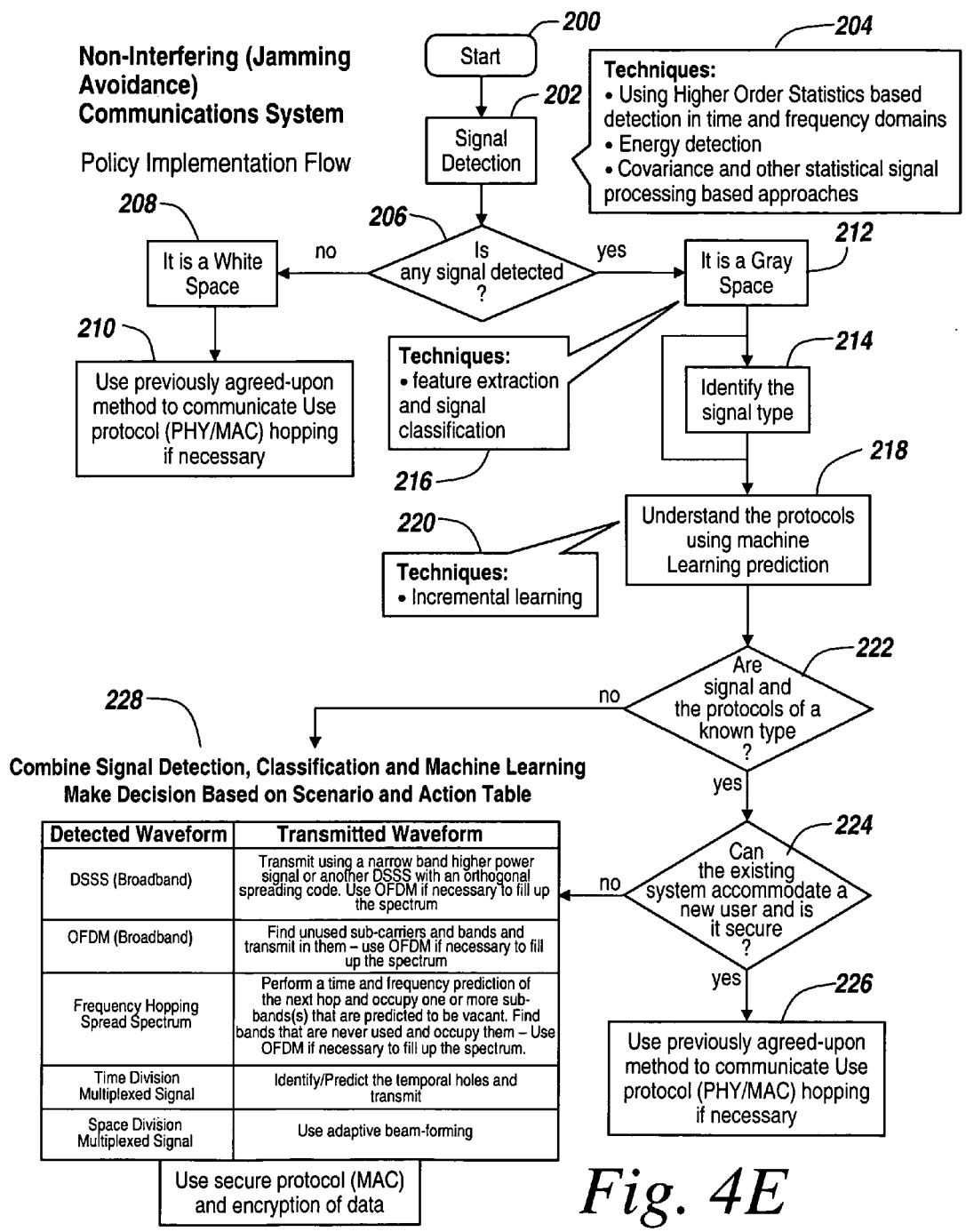

Referring now to FIG. 4(e), what is shown is a block diagram of the actual logical flow of how a cognitive communication system operates. In this case, the goal of the system is to provide non-interfering transmissions which are not going to jam any existing signals or interfere in any possible way.

This figure gives a graphical illustration of one embodiment of subject cognitive communications system and in particular shows how it will detect signals, extract features, perform clustering (un-supervised learning), classify the signal in types, learn and predict the time and frequency domain behaviors and based on some decision metrics or policies transmit a non-interfering signal in either White Space or Gray Space.

In this figure what is presented is a flow chart for non-interfering communications. Starting at box 200, one activates the sensing operation at box 202. This is where signal detection occurs, since the first task that the system performs is to identify the signal space in which one wants to operate and to perform spectrum sensing, namely signal detection. Note that there are many different techniques for signal detection based on a number of factors. In one embodiment, higher order statistical signal processing is used for detection of the signals, but one can do initial energy detection as a first cut. Thus, as seen in box 204, one can use higher order statistical base detection in time and frequency domains, energy detection or covariance and other statistical signal processing-based detection.

As can be seen at box 206, a decision is made as to whether a signal is detected. If no signal is detected in any signal space, then one has White Space as indicated at 208, and one can use any previously agreed-upon method to communicate in this White Space as indicated at 210.

On the other hand, if a signal is detected, then one has to ascertain Gray Space as illustrated at 212. If Gray Space is detected, one has some room left to transmit more information. If one is able to prove that there is sufficient space that is available, then the next thing to be accomplished is to identify the signal type as illustrated at 214. Signal identification is accomplished by techniques illustrated at 216 to include feature extraction and signal classification. Note that just identifying signal type is not enough. For example, identifying that the incoming signal is a CDMA, direct sequence spectrum signal or OFDM signal is not enough. One needs to understand the protocol in terms of how the signal is occurring and what patterns exist in the signal. This is carried out by using machine learning and prediction as illustrated at 218 involving incremental learning as illustrated at 220.

The system understands whether the incoming signals and protocols are of a known type. For instance, there are certain circumstances where one can clearly ascertain, for example, that the incoming signal is an 802.11 signal. It follows certain protocols involving a frame, a downlink, an uplink and a certain pattern. Based on these protocols, one always knows what the signal will look like in the future. The problem then becomes a simple problem because one has already identified that the incoming signal follows a known protocol.

The fact that a known protocol is indicated at 222, and having ascertained this, a decision block 224 is invoked to answer the question, "Can the existing system accommodate a new user and is it secure?" If the answer is yes, then as illustrated at 226 the previously agreed-upon method to communicate using a certain type of protocol is invoked.

However, if the signal is not of a known protocol, then one has to learn what the protocol is. This is based on the utilization of a Scenario and Action Table and discussed in more detail in connection with FIG. 4(*f*). However, once the signal is identified and classified, then one can learn where it is going to exist and to be able to transmit in the Gray Space.

Referring to FIG. 4(*f*), a Scenario and Action Table 228 is described. In this table, the system defines the policy sets, namely what is the policy set going to be in order to obtain non-interfering communications. For example, if one identifies that the detected wave form is classified as a direct sequence spread spectrum wave form, the table specifies what the system will do. If the Scenario and Action Table determines that the signal is an OFDM signal, again the table specifies what is to be done. Note, for a DSSS broadband signal, one is able to transmit a higher power signal or another DSSS signal with an orthogonal spreading code. One can also create a frequency hopped signal using an OFDM signal by selectively switching its sub-carriers on or off as time progresses.

If the signal is detected as an OFDM broadband signal, one finds unused sub-carriers and bands and then transmits in them. Another OFDM signal may be used to fill up the unused sub-channels or the White Spaces.

If on the other hand, the detected signals are frequency hopping spread spectrum signals, one performs a time and frequency prediction of the next hop and then makes sure that the transmitted signals occupy one or more time frequency sub-bands that are predicted to be vacant. The system in one embodiment finds the bands that are never used and then occupies them.

With respect to a time division multiplex signal arriving at the system, one identities and predicts the temporal holes and transmits in these holes.

Finally, if a space division multiplex signal is detected, one can use adaptive beam firming to make sure that there are no interfering signals at a particular location.

Referring to FIG. 5(*a*), a Scenario and Action Table is provided for cognitive jamming. The subject system replaces a so-called "dumb" jammer with a smarter, jammer. A dumb jammer will have an infinite amount of energy to expend, and it will not try to understand exactly what the signals look like that one is trying to jam or what their protocols are. It will just try to jam the signal with all the power and might that it has. This is obviously a brute force approach.

However, one can make very efficient use of one's resources. For instance, if one were able to identify what kind of signal is being used in a given spectrum and the protocols that is using, then one can do a smart and targeted jamming operation which in essence saves energy and power. This creates maximum damage at minimum cost.

It is noted that in some jamming systems deployed on aircraft one does not have unlimited power which is a problem for brute force.

In FIG. 5(*a*), the Scenario and Action Table for cognitive jamming 230 discusses, for instance, what is to be deployed when one detects, for instance, a DSSS broadband signal. In this case, one transmits using a narrowband high power signal on the DC component, one transmits a broadband signal, such as OFDM, to occupy the DSSS bandwidth or one transmits another DSSS signal with the same spreading code. To jam an OFDM broadband signal, one finds the sub-carriers and sub-bands and transmits in them.

If one is to try to jam a frequency hopping spread spectrum signal, one performs a time and frequency prediction of the next hop and then occupies one or more sub-bands that are predicted to be unoccupied.

For jamming time division multiplex signals, one identifies and predicts the next time of arrival and transmits any complementary but dissimilar waveform with respect to the original one.

Finally, for a space division multiplex signal, one performs an adaptive beam steering procedure to target the beam at the receiver and transmit any complementary but dissimilar waveform with respect to the original one to disrupt the communications.

Finally, referring to FIG. 5(*b*), what is shown is a cognitive jamming flow chart. As illustrated at 300, in order to start the cognitive jamming sequence, one proceeds with spectrum sensing at 302 to find out whether or not a signal is detected. If not, as illustrated by decision block 304, one ascertains that there is White Space available at 306, which results at 308 with no jamming action being necessary.

As illustrated at 310, techniques for determining the presence of signals include using higher order statistics based detection in time and frequency domains, as well as energy detection and covariance in other statistical signal processing-based approaches.

Again, if there is a Gray Space, as illustrated at 310, then one identifies a signal type, as illustrated at 312, using feature extraction and signal classification techniques, and then, as illustrated at 314, one understands the protocols associated with the incoming signal to begin using machine learning and prediction using incremental learning, as illustrated at 316.

As illustrated at decision block 318, if there are any signal protocols matched to a known type, one exploits the known vulnerabilities, as illustrated at 320, and tailors the transmitted signal to jam the detected signal with its known vulnerabilities.

If the signal type is not known, as illustrated at block 322, one can transmit any complementary but dissimilar waveform with respect to the original one to jam it in time, frequency, code, space or location. In order to transmit jamming radiation, as can be seen from Scenario and Action Table 324, selected jamming techniques may be utilized.

By way of further explanation, experiments have been carried out on simulated data as well as the over the air collected test waveforms of the various devices operating in the Industrial Scientific and Medical (ISM) bands. These devices following a wide variety of standards such as the Bluetooth™, IEEE 802.11b and IEEE 8022.11 g were made to transmit and the waveforms were collected and down-converted to base-band using an Agilent 89640 signal analyzer, as is disclosed in *IEEE Standard for Wireless Personal Area Networks Based on the Bluetooth™ v1.1 Foundation Specifications*, http://www.ieee802.org/15/pub/TG1.html, IEEE Std. 802.15.1, 2002; and *IEEE Standard 802.11b, g 2003, Part 11: Wireless LAN Medium Access Control (MAC) and Physical Layer (PHY) Specifications: Higher-speed Physical Layer Extension in the 2.4 GHz Band.*, IEEE Std. 802.11, 2003, the contents of both of which are incorporated herein by reference. The signal analyzer has a bandwidth of approximately 36 MHz which sufficiently covers the spectral foot-print of most signals. The analyzer has 24 digital demodulators with settable center frequency. The center frequency for the digital down-conversion was kept in the center of the ISM band and no prior knowledge of the type of signals present in the spectrum was assumed. The down-converted pass-band waveform samples were subjected to go through the various processes of the cognitive radio functional blocks shown in FIGS. 1(a) and 1(b). In the subsections each of these blocks and functionalities is briefly described.

2. Clutter Suppression and Signal Detection

The first step for any cognitive radio is to understand the surrounding environment and to detect the ambient signals that are present. Signal detection algorithm must be designed such that it can detect a wide variety of signal types. The two processes that must be carried out to separate the meaningful signal are clutter suppression and signal detection. Clutter suppression may be carried out using sub-space enhancement techniques. Signal detection in Gaussian noise may be carried out using the Higher Order Statistics (HOS) as is disclosed in J. M. Mendel, "Tutorial on Higher Order Statistics (Spectra) in Signal Processing and Systems Theory: Theoretical Results and Some Applications," Proc. of IEEE, 79(3):278-305, March 1991, the contents of which are incorporated herein by reference. The fact that the cumulants of the order higher than two for a Gaussian process are zero may be used to detect the signals in the Gaussian noise. The received waveform samples may be grouped into segments and higher order cumulants for each of these segments may be estimated. The detection thresholds are defined after a period of learning the distributions of the moments and cumulants, and decision is made whether a particular segment of the received samples contains any meaningful information or not. FIG. 2(a) shows how signal detection may be carried out in Gaussian noise using HOS. The top figure shows the time domain waveform of the Bluctooth™ signal heavily buried in noise. The figure in the middle shows the spectrogram of the same signal and the figure at the bottom shows the probability that some useful signal is detected for different time segments of the received waveform using HOS. It can be seen that even though the Signal of Interest (SOI) is heavily buried in noise, this signal detection scheme works well with a reasonably good Probability of Detection ($P_D$).

2. Feature Extraction and Clustering

Once a useful signal is detected, feature extraction plays an important role of information assimilation such that the salient characteristics of the signals may be identified and the detected signal or signals may be assigned to appropriate classes. FIG. 1(a) shows how in a cognitive communications system, feature extraction feeds the signal classification stage and vice-versa. While selecting the features, it is important to keep in mind the questions that one would like the classifier to answer. Some of the questions include Is it White Space or Gray Space?
Is the signal Broad-band or Narrow-band?
Is it a Broad-Pulse or Narrow-Pulse signal?
Is it a Frequency Hopping or Non-Frequency Hopping signal?
Is it a Single-Carrier or Multi-Carrier signal?

All these questions may be answered using various signal processing methods which involve clustering (un-supervised learning), image processing, mapping, singular value decomposition and other sub-space based tracking techniques on the various forms of the data sets. FIG. 2(b) shows an example of spectrogram clustering in order to classify the signals that are present in the given spectrum. The example shows both Bluetooth™ as well as the IEEE 802.11b signals operating in the same spectrum. The detected signals in a frame of 10 mS window are clustered into groups. Some of the features are extracted from these clusters in order to separate the signal types operating in the spectrum.

Many different features may be extracted from the signal however few are useful. Hence it is important to perform sufficient statistics analysis or to optimize the feature set as is disclosed in E. C. Real, "Feature Extraction and Sufficient Statistics in Detection and Classification," *ICASSP—International Conference on Acoustics Speech and Signal Processing*, vol. 6, pp. 3049-3052. May 1996; and R. O. Duda, P. E. Hart, and D. G. Stork, *Pattern Classification*, Wiley's Interscience New York, 2001, the contents of both of which are incorporated herein by reference. Feature optimization will choose the best features from the feature set to separate the signal of interest effectively, whereas sufficient statistics analysis on the feature vector and its distributions will help determine if the existing feature set is sufficient for any new signal or protocol that is detected.

3. Signal Classification

Figure 2C:
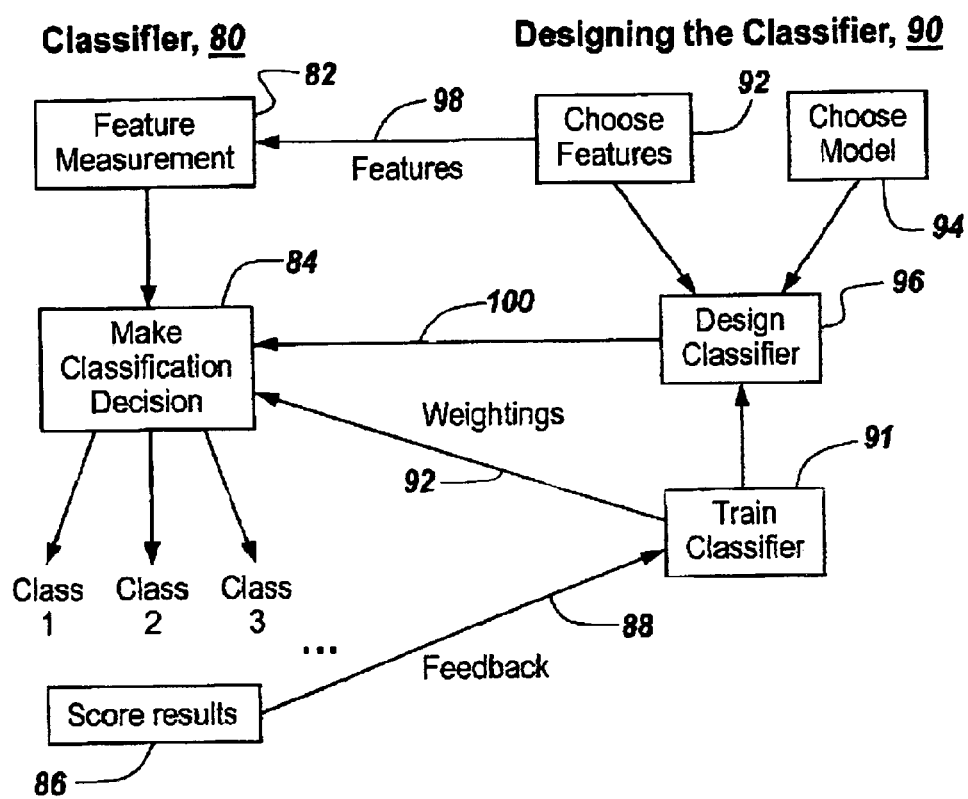
FIG. 2(c) is a diagrammatic illustration showing the classifier design process.

FIG. 2(c) shows the steps to be followed by the cognitive system to design a classifier. The first step is to develop a model of the system of interest, followed by determination of the key, measurable features. Based on these system aspects, the classifier identifies and characterizes the signal. The classifier itself, regardless of its type, generally consists of a feature measurement phase and a classification phase. The initial weightings or coefficients of the classifier are modified during a training phase based on the classification results against known data. Classifiers can be characterized by the types of algorithms used:

Computational classifiers use definite metrics to separate classes. Examples include a nearest-neighbor and support vector machine.

Statistical classifiers estimate classes based on models of what the world of interest looks like. An example are the Bayesian networks, which rely on a priori assumptions.

Connectionist classifiers are based on our understanding of how the brain works. The brain consists of a huge number of nerve cells, each of which has multiple connections to other nerve cells. This is a non-linear process. Neural networks (or perceptron networks) use non-linear elements with variably weighted inputs. Associative learning approaches seek to match current data with stored patterns.

Figure 2D:
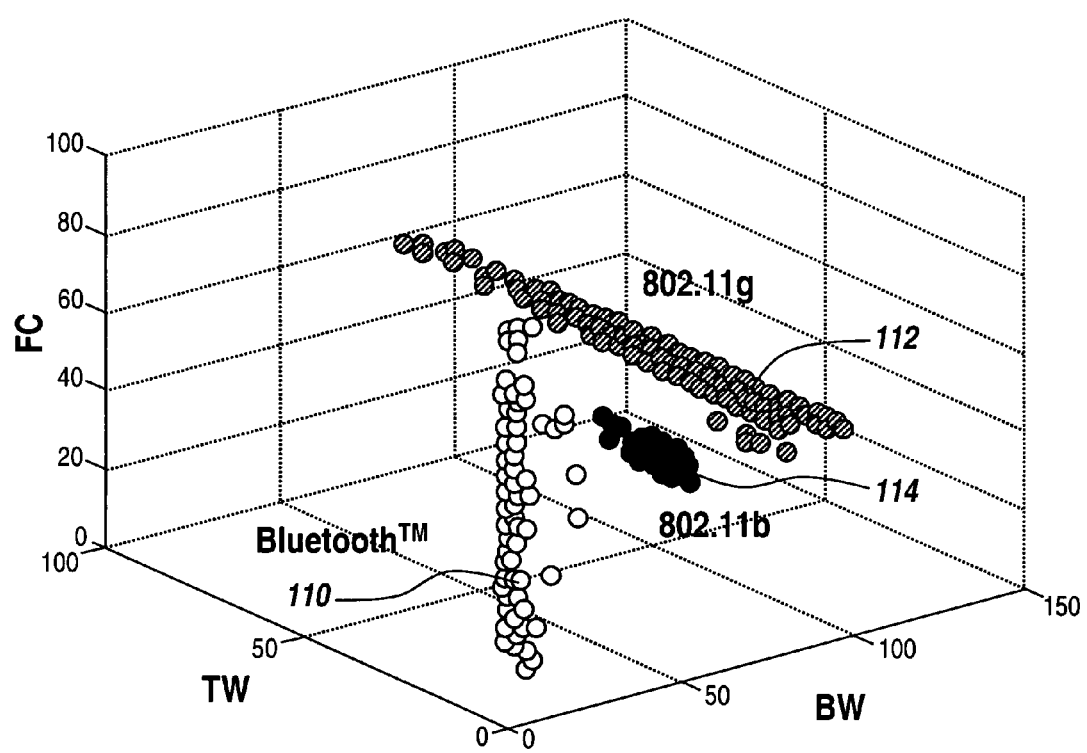
FIG. 2(d) is a diagrammatic illustration showing signal classification based on the extracted features.

The subject cognitive system emphasizes connectionist classifiers as these methods require the fewest assumptions and are most applicable to problem in which a priori information is lacking. FIG. 2(d) shows an example of signal classification based on the extracted features from FIG. 2(b). The compared features are spectral bandwidth (BW), temporal width of the clusters (TW), and center frequency for each of the clusters (FC) for the received over the air collected data for the signals belonging to the Bluetooth™ as is disclosed in *IEEE Standard for Wireless Personal Area Networks Based on the Bluetooth™ v1.1 Foundation Specifications.* http://www.ieee802.org/15/pub/TG1.html, IEEE Std. 802.15.1, 2002, the contents of which are incorporated herein by reference; and also IEEE 802.11b and IEEE 802.11g Standards. For the processed signals, these three features effectively characterize signals as belonging to one of the three classes. The clusters are generated using the Single Linkage Clustering Algorithm. A nearest-neighbor classifier is then used to match each input signal feature triplet (BW, TW, FC) to the existing cluster centroids.

It is noted that open set classification helps to detect a new signal. Open set classification is the classification of data from signal classes that were not part of the original training set (the closed set). Classifiers that are not designed to account for this eventuality will often attempt to assign the received signal to one of the training set classes, potentially resulting in a misclassification. Real and Baumann have proposed a method for overcoming this problem based on the tolerance interval analysis as is disclosed in E. C. Real and A. H. Baumann, "Open set classification using tolerance intervals," *Thirty-Fourth Asilomar Conference on Signals. Systems and Computers*, Volume 2, Page(s):1217-1221, Oct. 29-Nov. 2, 2000, the contents of which are incorporated herein by reference.

Open set classification plays an important role in a cognitive communications system to detect and classify a new signal. Another way of thinking about the open set classification is as follows. A given set of training data will cover some volume of the class's actual (unknown) feature space. If one would like the training data to cover c % of the actual class feature space with probability P, we can compute the number of independent training samples N required. From the training data one computes closed bounds specifying the set membership volume of a given class, as opposed to partitioning the entire feature space into a finite number of regions. When a new feature vector falls outside all of the established regions, it is declared as a new class. Open set classification is an important functionality of a cognitive communications system.

4. Machine Learning and Prediction

Machine Learning can be concisely defined as a process when a machine (e.g. a computer program) changes its structure, program, or data in response to inputs so that its future performance improves as is disclosed in P, Nilsson, *Introduction to Machine Learning*, http://ai.stanford.edu/people/nilsson/mlbook.html, 1996, the contents of which are incorporated herein by reference. While many software programs are designed to perform the same way each time they are run, it is often useful to develop programs, algorithms, and systems that can learn from experience. The subject cognitive communications system is based on the concept that the deployed system will learn from its RF environment by characterizing new types of signals and transmission protocols, using an incremental learning approach that continues to adapt while the system is operational and new data is collected.

A system that can learn will mimic aspects of pattern matching and prediction as performed in human cognition. The pattern-matching function of our brain is constantly producing short-term predictions based on stored patterns and incoming sensory data; most of the time these predictions are correct. Failed predictions, however, lead to learning, which is the development of new patterns. This cognitive pattern matching and prediction model can be profitably applied to problems in which the range of potential patterns and features of interest are limited. A cognitive communications system is a good example of such a problem, since the features of interest are limited to time and spectral features of signals, with no need for external data or decoding of the information contained in the signals themselves. The subject system further limits the scope of the problem by developing a pattern-matching and prediction algorithm implemented on conventional (Von-Neumann architecture) computers.

As shown in FIG. 2(c), machine learning enables a self-designing, self-adapting classifier, in contrast to standard classifier design which is heavily reliant on (human) designer inputs, since the types of objects to be classified are often problem-specific, and can change over time. In particular, machine learning enables our system to:

Characterize the time and frequency domain behavior of the signal types

Predict the future time and frequency domain behaviors of the signal types

Identify the presence of new signal types

Construct models and features for new signal types

Maintain previously acquired knowledge (old signal types)

Modify weightings based on observed data

The subject approach develops predictions of future values of specified features using multiple adaptive learning predictor functions. It matches the input feature values to stored measurements of previously observed patterns and develops a prediction from each pattern based on current feature values and accumulated prior history. The best prediction at each time frame is selected based on the calculated confidence of each predictor for its current input values.

The first step is to develop clusters of patterns. The clustering is based on the similarity of key features for these patterns, and can be performed using a clustering algorithm such as Single Linkage Algorithm. Each cluster then represents a type of pattern. For each cluster, predictions of future feature values can be developed using one or more of the features used to characterize the cluster. The input and output values for each predictor are based on the observed statistics to date for that cluster. The statistics (# of outputs of parameter value Z in terms of input parameter values X, Y, etc) for each cluster are stored rather than the series of raw inputs.

In operation, each input data set of features is compared to the existing clusters to determine what type of pattern is being matched. The comparison can be made using classification algorithms such as Nearest Neighbor Algorithm. In order to select the best prediction at each point in time, the quality or confidence value of each predictor is calculated. The quality measurement used is the measure of the ambiguity of each specific output prediction, with the least ambiguous prediction being the best. This can be measured, for instance, by calculating the fullwidth at half maximum for each predictor (based on the input values) and selecting the narrowest one. The ambiguity or quality measurement can be used to place error bars around the predicted time of next transmission. If none of the predictors provide a high enough confidence value for satisfactory end-system use, additional predictors can be developed for future use by adding more input features (either internal to the signal or external, such as time of day) or developing predictors for higher-level (multi-layer) patterns.

FIGS. 3(a)-3(d) show the machine learning and prediction module that will estimate the future behavior of the signals. This setoff figures show how incremental learning improves the performance of the next time hop predictor for the Bluetooth™ signal shown in 3(a). As more information is available, the prediction spikes become larger improving the prediction capability shown in 3(c) and 3(d). The FIG. 3(b) shows how based upon certain quality factors the best predictor may be chosen from a library of predictors.

5. Decision Metrics and Policies

In order for a number of cognitive communications devices to operate in the network, certain policy sets must be devised. These policy sets make the co-existence of multitudes of such devices possible. There may be policies for signal transmission, for the initialization protocols, for spectrum usage per node, etc. The devised policy sets must also keep in mind that not all the devices operating in the network will have cognitive capabilities.

The prior art has started looking into the game-theoretic approaches to choosing the right set of policies as is disclosed in S. Haykin, "Cognitive Radio: Brain-Empowered Wireless Communications," *IEEE J. Select. Areas Commun.*, vol. 23, no. 2, pp__201-220, February 2005, the contents of which are incorporated herein by reference. Amongst the many techniques, no-regret algorithms hold promise. No-regret algorithms are probabilistic learning algorithms which specify that players explore the space of actions by playing all actions with some non-zero probability, and exploit successful actions, by increasing the probability of employing those actions that generate high profits. Learning converges to the correlated Nash equilibrium. No regret algorithms try to minimize regret or leave no-regret externally or internally as follows:

External Regret: Difference between the payoff's achieved by the strategies prescribed by the given algorithm, and the payoffs achieved by any other fixed sequence of decisions, in the worst case.

Internal Regret: Difference between the payoffs achieved by the strategies prescribed by the given algorithm, and the payoffs that could be achieved by a re-mapped sequence of strategies.

The LaGrangian hedging algorithm chooses an optimal policy from a very large set of policies by LaGrangian multipliers. It involves two steps, I. Prediction and II. Scaling. Prediction tries to estimate the cost of choosing a wrong policy and scaling weighs the risk and the cost. LaGrangian multipliers are used to not let the regret vector to grow. A hedging parameter must be chosen which tries to evade the risk of defeat by keeping the option of retreat open.

In a Φ-No-Regret algorithm, the set of policies to choose from is smaller. A weighting function maximizes the utility function resulting in a guaranteed convergence to some Φ equilibrium. This algorithm has a potential for using mixed strategies.

6. Cognitive Communication in White as Well as the Gray Space

The goal of this program has been to develop a cognitive capability to detect and classify the signal types present in a given spectrum of interest without going into the signal internals, to learn the time and frequency domain patterns of the received signals, predict their future behavior and based on certain policy sets to transmit a signal in the White as well as the Gray space such that the new signal or signals do not interfere with the existing ones. As described above, the subject system uses two different policy sets. One, for a non-competitive cognitive device that will use only as much space for signal transmission as it requires, and the other for a competitive cognitive device that will use the prediction information to occupy all the possible space that it thinks is available.

FIGS. 4(a)-4(c) show this non-interfering signal transmission in the White as well as the Gray space based on our policy sets. FIG. 4(a) shows a scenario where the classifier detects a (Single-Carrier+Non-Frequency Hopping+Broadband=DSSS signal). Based on the policy set, a Frequency Hopping Spread Spectrum (FHSS) waveform is transmitted over the entire band. FIG. 4(b) shows a scenario where the classifier detects a (Multi-Carrier+Non-Frequency Hopping+Broad-band=Orthogonal Frequency Division Multiplexing (OFDM) signal). An FHSS signal is transmitted only in the White Space. FIG. 4(c) shows an example of a non-competitive communication scenario which makes use of only as much band-width as it needs making sure that the original FHSS (Multi-Carrier+Frequency-Hopping+Narrow-band) signal is not destroyed. FIG. 4(d) shows an example of a competitive signal transmission where prediction information in time as well as the frequency is used to transmit in all the possible windows that the radio "thinks" are available. Error in prediction results in a part of the original signal being destroyed. This example showed a simple scenario for signal transmission in the White as well as the Gray spaces using non-competitive and competitive policy sets.

FIG. 4(e) shows the general flow diagram for a non-interfering and jam-resistant cognitive communications system where the functionalities shown in FIGS. 1(a) and 1(b) have been incorporated along with the Physical (PHY) layer policy sets. The system initially performs spectrum sensing/signal detection. If no signal is detected then this is termed as a White Space, else it is termed as a Gray space. For a Gray space, feature extraction, signal classification and machine learning are used to match a signal and/or the communications protocols to a known type/Standard etc. Based on the decision made by the machine learning and prediction module, action is taken based upon competitive or co-operative policy sets shown in the Scenario and Action Table in FIG. 4(f).

7. Cognitive Jamming

Figure 5B:
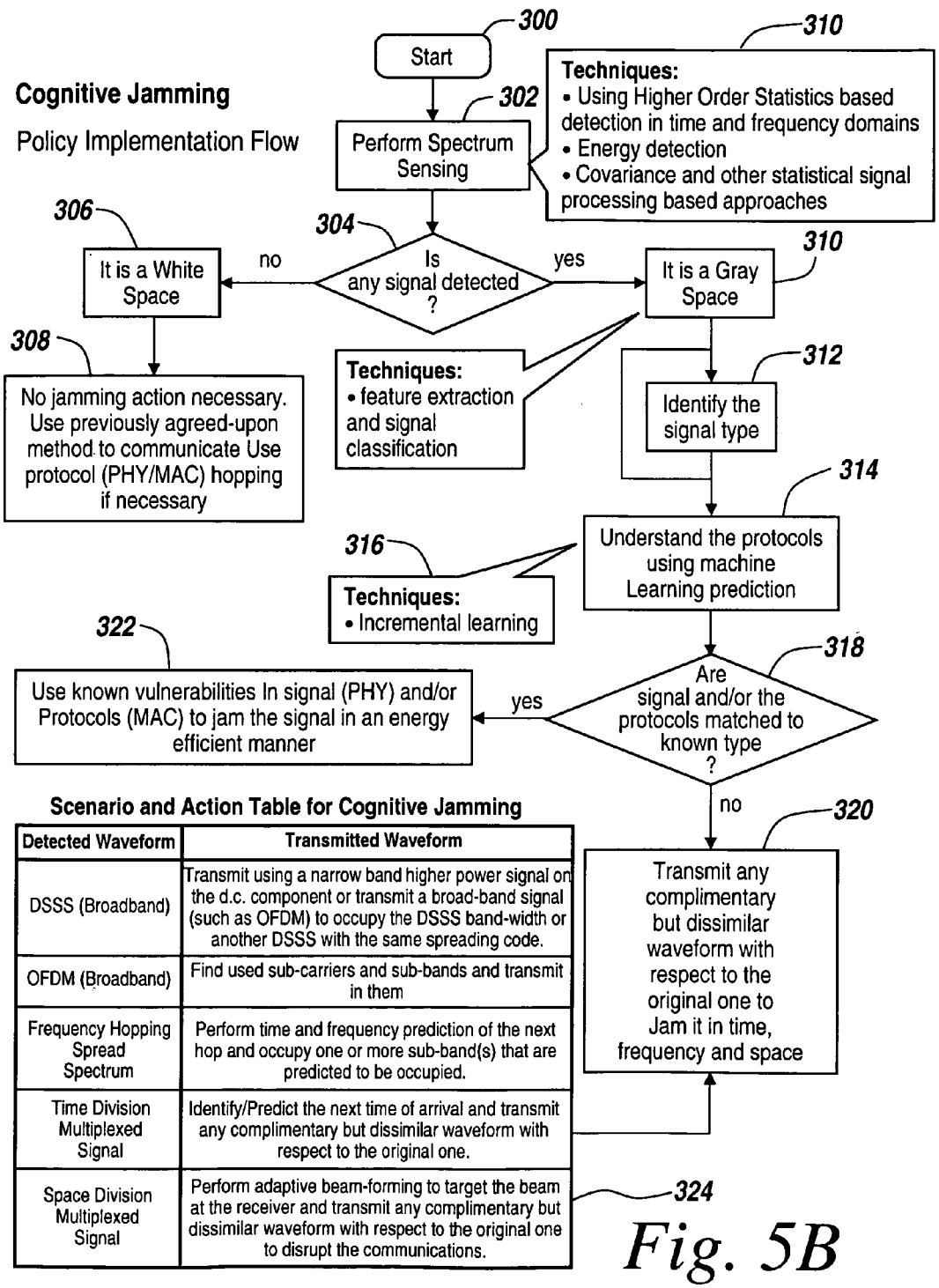
FIG. 5(b) is a diagrammatic illustration of a scenario and action table for the Cognitive Jamming Physical Layer policy set when the signals and protocols are detected and are of a known type.

FIG. 5(a) shows the general flow diagram for a cognitive jamming system where the functionalities shown in FIGS. 1(a) and 1(b) have been incorporated along with the Physical (PHY) layer policy sets. The system initially performs spectrum sensing/signal detection. If no signal is detected then this is termed as a White Space and no action is necessary. Otherwise it is termed as a Gray space. For a Gray space, feature extraction, signal classification and machine learning are used to match a signal and/or the communications protocols to a known type/Standard etc. Based on the decision made by the machine learning and prediction module, action is taken to jam the existing signal in the most energy efficient manner. The Scenario and Action Table for cognitive jamming PHY layer policy sets are shown in FIG. 5(b).

In summary, the present invention involves a cognitive communications system that combine the areas of communications, signal processing, pattern classification and machine learning to detect the signals in the given spectrum of interests, extracts their features, classifies the signals in types, learns the salient characteristics and patterns of the signal and predicts their future behaviors. Sophisticated signal processing enables extraction of the salient features of the signal without going into their internals. Incremental learning allows knowledge enhancement and improved prediction capability with time. The cognitive communications system uses the classification and prediction information to transmit a signal in White as well as the Gray space such that it does not interfere with the existing users, resulting in increased and efficient usage of the spectrum. Two policy frame-works are devised for non-competitive and competitive cognitive devices. A non-competitive device plays it safe and uses only as much space that it needed. On the other hand a competitive or a greedy device uses all the space that it thought it could have based on the prediction information resulting in errors and interference with the existing users in the spectrum.

While the present invention has been described in connection with the preferred embodiments of the various figures, it is to be understood that other similar embodiments may be used or modifications or additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A method for permitting maximum utilization of a frequency spectrum utilizing a cognitive communication system, comprising the steps of:
   conducting an autonomous radio scene analysis of the signal space for non-interfering signal transmissions where the signal space may consist of at least one of time, frequency, space and code;
   performing radio scene analysis or spectrum sensing using higher order statistics to detect the presence of signals, such that if no signal is detected, then that space is determined to be White space which may be used for signal transmission, whereas if signal is detected, then that space is determined to be Gray space, the analysis including
   classifying the detected signal through feature extraction in which:
   the time and frequency domain behavior is analyzed using spectrogram followed by a single linkage clustering to identify the clusters belonging to the same signal,
   time width, bandwidth, carrier frequency of clusters is used to distinguish between various signal types,
   standard deviation of the carrier frequency of clusters is used to distinguish between non frequency hopping and frequency hopping signals,
   singular value decomposition of the detected signals is performed to identify the code space,
   connectionist classification is used to distinguish between various signal types,
   incremental un-supervised learning is used to predict signal patterns,
   the time frequency detection ratio is used to classify the signal as single carrier or multi-carrier,
   the signal space is divided into: broadband or narrowband, frequency hopping or non-frequency hopping, broad pulse or narrow pulse, single carrier or multi-carrier, one signal type or multiple signal types,
   time or arrival prediction is performed using incremental learning over time since last pulse to time to next pulse, and
   competitive or non-competitive policy sets are defined for signal transmission thus to complete the radio scene analysis, wherein
   OFDM signal is transmitted in the White Space, a narrow band signal or another DSSS with an orthogonal spreading code is transmitted in the Gray space if DSSS signal is detected, signal is transmitted on unused sub-carriers and un-used bands if an OFDM signal is detected,
   signals are transmitted in bands that are never used, OFDM is used to fill up the un-used spectrum, temporal spectral holes are used for signal transmission for a TDMA signal, adaptive beam-forming is used for signals that can be separated in space for signal transmission, and DSSS or FHSS signals are transmitted on unused hands, and when time and frequency prediction of the next hop is carried out, signal is transmitted in one or more sub-bands that are predicted to be vacant if an FHSS signal is detected.

* * * * *